(12) United States Patent
Yu

(10) Patent No.: US 7,921,001 B2
(45) Date of Patent: Apr. 5, 2011

(54) COUPLED ALGORITHMS ON QUADRILATERAL GRIDS FOR GENERALIZED AXI-SYMMETRIC VISCOELASTIC FLUID FLOWS

(75) Inventor: Jiun-Der Yu, Sunnyvale, CA (US)

(73) Assignee: Seiko Epson Corporation, Tokyo (JP)

( * ) Notice: Subject to any disclaimer, the term of this patent is extended or adjusted under 35 U.S.C. 154(b) by 518 days.

(21) Appl. No.: 11/961,851

(22) Filed: Dec. 20, 2007

(65) Prior Publication Data

US 2008/0103742 A1    May 1, 2008

Related U.S. Application Data

(63) Continuation-in-part of application No. 11/205,441, filed on Aug. 17, 2005, now Pat. No. 7,478,023.

(51) Int. Cl.
*G06G 7/50* (2006.01)
(52) U.S. Cl. ............... 703/9; 347/108; 137/12
(58) Field of Classification Search ........ 703/9
See application file for complete search history.

(56) References Cited

U.S. PATENT DOCUMENTS

| | | | |
|---|---|---|---|
| 4,978,485 A * | 12/1990 | Daugherty et al. | ........... 264/412 |
| 6,179,402 B1 | 1/2001 | Suzuki et al. | |
| 6,257,143 B1 | 7/2001 | Iwasaki et al. | |
| 6,283,568 B1 | 9/2001 | Horii et al. | |
| 6,315,381 B1 | 11/2001 | Wade et al. | |
| 6,322,186 B1 | 11/2001 | Shimizu et al. | |
| 6,322,193 B1 | 11/2001 | Lian et al. | |
| 6,579,724 B2 | 6/2003 | Woodward | |
| 6,654,710 B1 | 11/2003 | Keller | |
| 7,152,017 B2 * | 12/2006 | Tanahashi et al. | ........... 702/183 |
| 7,201,224 B2 * | 4/2007 | Corvera-Poire et al. | ...... 166/249 |
| 2003/0060988 A1 | 3/2003 | Ginzburg | |
| 2003/0182092 A1 | 9/2003 | Yu et al. | |
| 2004/0131778 A1 | 7/2004 | Verhoest et al. | |
| 2004/0181383 A1 * | 9/2004 | Yu et al. | ............................ 703/9 |

(Continued)

FOREIGN PATENT DOCUMENTS

JP    09323431    12/1997

OTHER PUBLICATIONS

Kupferman, Simulation of Viscoelastic Fluids: Couette-Taylor Flow, 1998, Journnal of Computional Physics 147, Article No. CP985934, pp. 22-59.*

(Continued)

*Primary Examiner* — Kamini S Shah
*Assistant Examiner* — Bernard E Cothran

(57) ABSTRACT

The present invention is directed towards systems and methods for simulating and analyzing viscoelastic fluid flow. The fluid flows through a channel and is ejected from a channel. The fluid has an interface between a first fluid and a second fluid. The method includes performing finite difference analysis and using a level set projection method to solve equations governing the viscoelastic flow of the fluids through the channel. The equations governing the viscoelastic flow include an azimuthal velocity term that is an approximate description of the azimuthal flow of the fluid. The equations governing the viscoelastic flow also include an approximation of the stress experienced by the fluids being simulated. The equations governing the viscoelastic flow include an advection term that includes an azimuthal velocity term. The finite difference analysis used to solve the governing equations includes a second-order Godunov type upwind scheme to update the advection terms over time. The level set for the first and second fluids is updated periodically during the simulation.

7 Claims, 7 Drawing Sheets

U.S. PATENT DOCUMENTS

| | | | |
|---|---|---|---|
| 2005/0022895 | A1 | 2/2005 | Barth et al. |
| 2005/0046649 | A1 | 3/2005 | Yu et al. |
| 2005/0084605 | A1 | 4/2005 | Kathirgamanathan |
| 2005/0114104 | A1* | 5/2005 | Friedl et al. .................... 703/2 |
| 2005/0179715 | A1 | 8/2005 | Merz et al. |
| 2006/0169800 | A1 | 8/2006 | Rosell et al. |
| 2006/0259288 | A1 | 11/2006 | Yu |

OTHER PUBLICATIONS

Collie et al., Numerical Simulation of the Turbulent flow past upwind yacht sails, Yacht Research Unit, pp. 1-22.*

Trebotich et al., A Projection Method for Incompressible Viscous Flow on Moving Quadrilateral Grids, 2001, Journal of Computational Physics 166, pp. 191-217.*

Dris et al., Flow of a viscoelastic fluid between eccentric cylinders: impact on flow stability, 1998, Elsevier Science B.V., pp. 59-87.*

Yu, et al., "Piezo Ink Jet Simulations Using the Finite Difference Level Set Method and Equivalent Circuit", IS&T's NIP19: 2003 International Conference on Digital Printing Technologies, pp. 319-322.

Bell, John, et al., "A Second-Order Projection Method for the Incompressible Navier-Stokes Equations," Journal of Computational Physics, vol. 85, No. 2, Dec. 1989, pp. 257-283.

Chopp, David L., "Computing Minimal Surfaces via Level Set Curvature Flow", Mathematics Department, University of California, Berkeley, California, Journal of Computational Physics 106, pp. 77-91, 1993.

Osher, Stanley, et al., "Fronts Propagating with Curvature-Dependent Speed: Algorithms Based on Hamilton-Jacobi Formulations", California, Journal of Computational Physics, pp. 12-49, Jun. 3, 1987.

Trebotich, David P., et al., "A Projection Method for Incompressible Viscous Flow on Moving Quadrilateral Grids", Journal of Computational Physics 166, pp. 191-217, 2001.

Yu, Jiun-Der, et al., "A Coupled Quadrilateral Grid Level Set Projection Method Applied To Ink Jet Simulation," Journal of Computational Physics, 206(1), pp. 227-251, 2005.

Bell, John B., "Projection Method for Viscous Incompressible Flow on Quadrilateral Grids", AIAA Journal, vol. 32, No. 10, Oct. 1994, pp. 1961-1969.

Sussman, Mark, et al., "A Level Set Approach for Computing Solutions to Incompressible Two-Phase Flow", Department of Mathematics, University of California, Los Angeles, California, Journal of Computational Physics 114, pp. 146-159, 1994.

Bell, John B., et al., "A Second-Order Projection Method for Variable-Density Flows", Lawrence Livermore National Laboratory, Livermore, California, Journal of Computational Physics 101, pp. 334-348, 1992.

Sakai, S., "Dynamics of Piezoelectric Inkjet Printing Systems", Proc. IS&Ts NIP16 International Conference on Digital Printing Technologies, pp. 15-20, 2000.

Miller, "Improvements in Computing Multiple Phase Flows," Dissertation, Doctor of Philosophy in Mathematics University of California, Los Angeles, 1998, pp. 1-53.

Rivkind, et al., "On Nonsymmetric Two-dimensional Viscous Flow through an Aperture," http://citeseer.ist.psu.edu/141663.html, 1998, pp. 1-26.

Sussman, et al., "An Adaptive Level Set Approach for Incompressible Two-Phase Flows," Journal of Computational Physics, 1998, pp. 1-44.

Meinhard, et al., "The Flow Structure Inside a Microfabricaed Inkjet Printhead," Journal of Microelectromechanical Systems, vol. 9, Issue 1, Mar. 2000, pp. 67-75.

Groth, C. P. T., et al., "A Parallel Adaptive Mesh Refinement Algorithm for Turbomachinery Flows," University of Toronto Institute for Aerospace Studies, May 28, 2003.

Yu, et al., "A Coupled Level Set Projection Method Applied to Ink Jet Simulation", Interfaces and Free Boundaries 5, 2003, pp. 459-482.

Naber, J.., "Numerical Solver for Compressible Two-Fluid Flow", Report MAS, Modelling, Analysis and Simulation, Feb. 2005, pp. 1-48.

Oldroyd, J. G., "On the Formulation of Rheological Equations of State", Proceedings of the Royal Society of London, Series A, Mathematical and Physical Sciences, Jul. 26, 1949, vol. 200, No. 1063, pp. 523-541.

Oldroyd, J. G., "Non-Newtonian Effects in steady motion of some idealized elastico-viscous liquids", Proceedings of the Royal Society of London, Series A, Mathematical and Physical Sciences, 1958, vol. 245, No. 1241, pp. 278-297.

* cited by examiner

COUPLED ALGORITHMS ON QUADRILATERAL GRIDS FOR GENERALIZED AXI-SYMMETRIC VISCOELASTIC FLUID FLOWS

CROSS-REFERENCE TO RELATED APPLICATIONS

This application is a continuation-in-part of prior U.S. patent application Ser. No. 11/205,441, filed Aug. 17, 2005, now U.S. Pat. No. 7,478,023, issued on Jan. 13, 2009, and is hereby incorporated by reference in its entirety.

U.S. Pat. No. 7,117,138 issued on Oct. 3, 2006, and U.S. Pat. No. 7,085,695 issued on Aug. 1, 2006 are hereby incorporated by reference in their entirety. U.S. Provisional Patent Application Nos. 60/684,763, filed on May 25, 2005 and 60/680,747, filed on May 13, 2005 are hereby incorporated by reference in their entirety.

FIELD OF THE INVENTION

The present invention relates to finite difference algorithms and associated models for simulating the ejection of viscoelastic ink. The algorithms may be embodied in software, hardware, or combination thereof and may be implemented on a computer or other processor-controlled device.

DESCRIPTION OF THE RELATED ART

Results of ink-jet simulation are useful in the design of ink-jet print heads. Ink-jet simulations may be carried out using analytical tools such as equivalent circuits that receive as input, the dynamic voltage to be applied to a piezoelectric actuator and simulates the ink behavior under the influence of the ink cartridge, supply channel, vibration plate, and actuator. The equivalent circuit can calculate input variables, which may be used inputs for computational fluid dynamics (CFD) code. The CFD code then solves the governing partial differential equations, i.e., the incompressible Navier-Stokes equations for two-phase flows, for fluid velocity, pressure and interface position, and feeds back the ink flow rate to the equivalent circuit. The sequence is repeated as long as needed.

The dynamics of fluid flow through the ink nozzle, coupled to surface tension effects along the ink-air interface and boundary conditions along the wall, act to determine the shape of the interface as it moves. Designing the CFD code largely involves taking into account the dynamically changing ink-air interface, which is quite challenging.

One method that has been used to model the ink-air interface is the volume of fluid method (VOF). The VOF method performs fairly well with regard to mass conversation but has problems accurately describing the surface tension aspects of fluid flow, especially when the ink droplet is smaller than 5 picoliters. Considering that the capability of ejecting ultra small ink droplets is essential for any photo quality ink-jet printer today, VOF methods have given way to improved modeling methods including the level set method, which can be more accurate at capturing the ink-air interface in CFD simulations. There is a mathematical relationship between the level set and the curvature of the interface that the level set describes. There is also a relationship between the surface tension of the interface and the curvature of the interface. Thus, the level set method can be very effective at describing the surface tension of the interface.

One way of solving the level set equations is by using finite element analysis. However, this method may result in mass conservation problems. Instead, the present invention proposes using finite difference analysis to solve the level set equations.

Prior art methods did not take into account the rotation of the fluid, i.e. the azimuthal velocity of the fluid. The present invention is directed towards methods of simulating a viscoelastic fluid that takes into account the azimuthal velocity of a fluid.

The present invention continues along this technological path of using finite difference analysis in ink ejection simulation. In so doing, the present invention provides substantial improvements in finite difference algorithms performed on rectangular grids for viscoelastic ink ejection simulations.

SUMMARY OF THE INVENTION

The present invention is directed towards systems and methods for simulating and analyzing viscoelastic fluid flow. The fluid flows through a channel and is ejected from a channel. The fluid has an interface between a first fluid and a second fluid. The method includes performing finite difference analysis and using a level set projection method to solve equations governing the viscoelastic flow of the fluids through the channel.

The equations governing the viscoelastic flow include an azimuthal velocity term that is an approximate description of the azimuthal flow of the fluid. The equations governing the viscoelastic flow also include an approximation of the stress experienced by the fluids being simulated. The equations governing the viscoelastic flow include an advection term that includes an azimuthal velocity term.

The finite difference analysis used to solve the governing equations includes a second-order Godunov type upwind scheme to update the advection terms over time. The level set for the first and second fluids is updated periodically during the simulation.

The equations governing the viscoelastic flow of the fluid includes a horizontal orthogonal planar velocity vector that that is orthogonal to a horizontal component of a fluid velocity vector that describes the velocity of the fluid. The vertical component of the horizontal velocity vector is substantially zero.

The fluid velocity vector and the horizontal velocity vector are described with reference to an axially symmetric coordinate system. The radial component of the horizontal velocity vector is equal to the negative of an azimuthal component of the fluid velocity vector. An azimuthal component of the horizontal velocity vector is equal to a radial component of the fluid velocity vector.

The finite difference analysis and the level set projection method are used to solve equations governing the fluid flow of a first and second fluid.

The fluid flow of the second fluid is viscoelastic.

A computer readable medium encoded with instructions which a computer can interpret to perform the present invention.

A system including logic elements for performing the present invention.

The equations governing the viscoelastic flow include a partial differential of a stress tensor along an azimuthal axis. The partial differential of the stress tensor is defined as $$\frac{\partial \tau}{\partial \theta} = \begin{pmatrix} -2\tau_{r\theta} & \tau_{rr} - \tau_{\theta\theta} & -\tau_{\theta z} \\ \tau_{rr} - \tau_{\theta\theta} & 2\tau_{r\theta} & \tau_{rz} \\ -\tau_{\theta z} & \tau_{rz} & 0 \end{pmatrix}.$$

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF THE PREFERRED EMBODIMENTS

The present invention is directed towards a method for numerically simulating viscoelastic fluid flow phenomena. Inks used in industrial printing applications may be viscoelastic, i.e. the relation between the stress tensor and the rate of deformation tensor at any particular instant depends on the deformation history.

Figure 1:
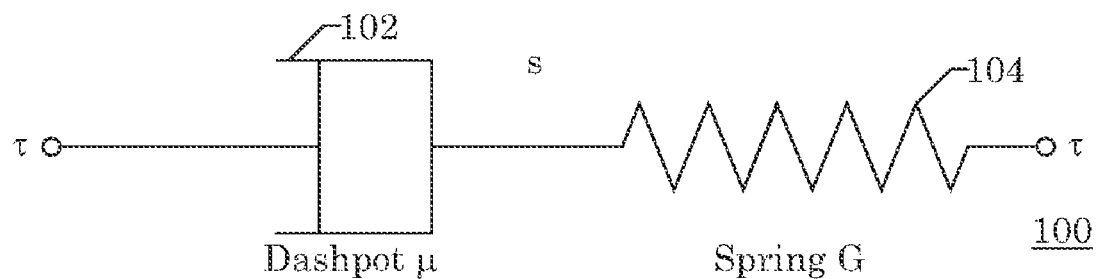
FIG. 1 is a symbolic illustration of a simple Maxwell's viscoelastic model.

FIG. 1 is an illustration of a simple Maxwell's viscoelastic model 100, which includes a dashpot 102 and a spring 104. In this model 100: $\tau$ is the stress; s is the rate of deformation; $\mu$ is the dynamic viscosity; and G is the elastic constant. Assuming both the spring 104 and the dashpot 102 in the model 100 are linear, we have equation (1) which is set forth in the Appendix along with the other numbered equations referenced in the following discussion.

Equation (1) is a differential equation which describes the stress $\tau$ at any given instant in time as depending upon on both the rate of deformation s and the temporal derivate of the stress $\tau$. The term $G/\mu$ is related to the relaxation time of the model 100 and is a defining characteristic of the model 100. The longer the relaxation time the more the viscoelastic fluid behaves differently from an ideal Newtonian fluid. The mechanical model for a Newtonian fluid is similar to Maxwell model 100 except that Newtonian model only has a dashpot 102 and no spring 104. The constitutive relation for Newtonian fluid is shown in equation (2), wherein the stress $\tau$ is a linear function of the rate of deformation s.

The fluid model considered in this work is based on the Maxwell type viscoelastic model 100. For simplicity of presentation, we consider a linear Maxwell model, wherein both the dynamic viscosity $\mu$ and the elastic constant G are constant. An embodiment of the present invention as described herein is in the context of continuum mechanics and includes aspects of the Oldroyd-B model.

Figure 2:
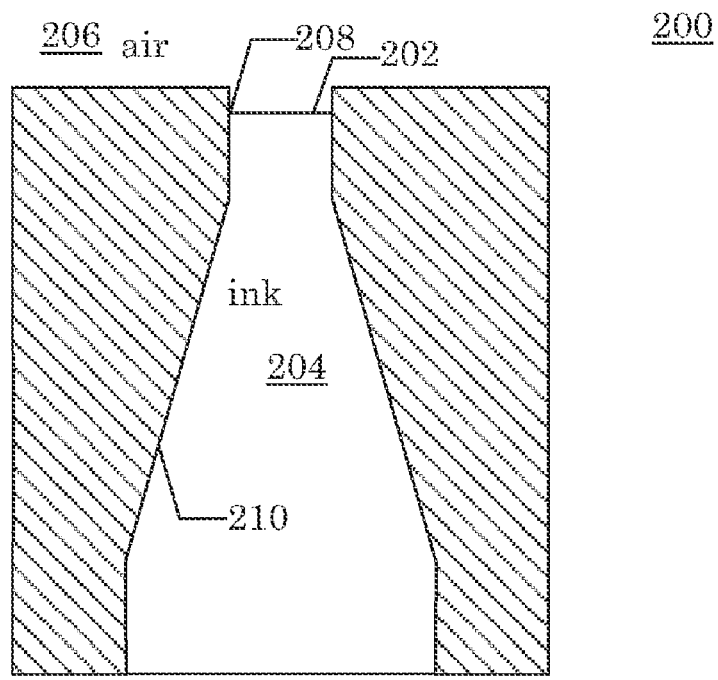
FIG. 2 is an illustration of a system which an embodiment of the present invention may be used to simulate.

An embodiment of the present invention is directed towards simulating a system 200 as illustrated in FIG. 2, which is described by two phase immiscible incompressible fluid flow in the presence of surface tension. The system 200 includes a density jump across the interface 202 separating ink 204 (the viscoelastic fluid) and air 206 (the Newtonian fluid).

Incorporated within the system may be a macroscopic slipping contact line model, which describes the dynamics of a second interface 208 between the air 206, the ink 204, and a wall 210. The fluid interface 202 between the air 206 and the ink 204 may be treated as an infinitely thin immiscible boundary, separating regions of differing but constant densities and viscosities. For boundary conditions on the walls 210 we assume that both the normal and tangential components of the fluid velocity vanishes, except at the second interface 208 where the slipping contact model may be used to describe the boundary conditions.

Equations of Motion

The ink 204 i.e., the first fluid, is a viscoelastic fluid. An embodiment of the present invention may use the Oldroyd-B viscoelastic fluid model to represent the first fluid. In accordance with Oldroyd-B viscoelastic fluid model, the first fluid is governed by equations (3). The air 206 i.e., the second fluid is governed by the incompressible Navier-Stokes equations i.e., equation (4). Some of the terms found in equations (3) and (4) are described in equation (5). Equation (6) is the Lagrangian time derivative.

The definition of the terms used in equations (3)-(6) are: $D_i$ is the rate of deformation tensor for fluid i; $\vec{u}_i(r,z)$ is the velocity of fluid i; $p_i \equiv p_i(r,z)$ is the pressure of fluid i; $\tau_1 \equiv \tau_1(r,z)$ is the viscoelastic stress tensor of the first fluid; $\rho_i$ is the density of fluid i; $\mu_i$ is the dynamic viscosity of fluid i; $\lambda_1$ is the viscoelastic relaxation time of fluid 1; and $\mu_{p1}$ is the solute dynamic viscosity of fluid 1. The subscript i=1, 2 is used to denote which fluid the particular variable or constant is associated with, 1 being the first fluid or the ink 204 and 2 being the second fluid or the air 206.

In the present embodiment, the second fluid 206 is assumed to be air, which behaves like a Newtonian fluid. Thus, the viscoelastic stress tensor $\tau_2$ vanishes for the second fluid 206. The dynamic viscosity $\mu_1$ of the ink is the dynamic viscosity of the ink solvent, which is typically water. Equation (7) list three of the terms from equation (3) which taken together constitute the upper convected time derivative (i.e., Oldroyd derivative) of the viscoelastic stress tensor $\tau_1$. The terms in equation (7) are used in the Oldroyd-B model to guarantee the material frame indifference. Equation (7) may also be thought of as the Lagrangian time derivative of the Kirchoff-Piola stress tensor of the second kind.

Since the size of the typical ink jet print head is small as is the mass of the liquid being simulated the gravity term tends to be inconsequential, and is omitted in this embodiment of the present invention. An individual skilled in the art would appreciate that the inclusion of the gravity term would not significantly alter the method described herein and recited in the claims.

It should also be appreciated that the methods described herein will work equally well when both fluids are viscoelastic. The present invention is directed towards a method of simulating a fluid in which the effect of the azimuthal velocity component $v(r,z)\hat{e}_\theta$ is taken into account, which had not been taken into account in prior art methods. In the present embodiment the velocity components, pressure, and elements of the viscoelastic stress tensor are dependent upon the spatial variables r and z.

The boundary conditions at the interface 202 of the first fluid 204 and the second fluid 206 are the continuity of the velocity ($\vec{u}_1 = \vec{u}_2$) and the jump condition as described by equation (8). In equation (8) $\hat{n}$ is the unit normal to the interface 202 drawn from the second fluid 206 to the first fluid 204; $\kappa$ is the curvature of the interface 202 and $\sigma$ is the coefficient of surface tension of the interface 202.

A level set function $\phi$, which is a signed distance function, is defined in an n dimensional space relative to a zero level set function $\Gamma$, which defines a n−1 surface in the n dimensional space. The absolute value of the level set function $|\phi|$ at a point in the n dimensional space is equal to the absolute value of the distance of the shortest vector from the point to the zero level set function $\Gamma$. The zero level set function $\Gamma$ separates the computational space into a first region and a second region. The level set function $\phi$ is positive in the first region and negative in the second region. The first and second regions may or may not be contiguous. The level set function $\phi$ is defined as zero at the surface $\Gamma$ thus giving its name to the zero level set function.

In the context of the present invention, the zero level set function $\Gamma$ is analogous to the interface 202. The first region is analogous to the region of space occupied by the first fluid 204 and the second region is analogous to the region of space occupied by the second fluid 206. The level set function may be defined in the space occupied by the first fluid 204 and the second fluid 206.

In the present invention the level set method is used to trace the interface 202. The unit normal $\hat{n}$ on the interface 202 can be expressed in terms of the level set function $\phi$ as shown in equation (9). Likewise the curvature $\kappa$ may be defined as the divergence of the unit normal vector $\hat{n}$ which applied to equation (9) gives us equation (10) which defines the curvature $\kappa$ in terms of the level set function $\phi$.

For the sake convenience, subscripts are dropped where possible. Thus, for $\phi > 0$: $u=u_1$; $\tau=\tau_1$; $p=p_1$; and $D=D_1$, and for $\phi < 0$: $u=u_2$; $\tau=0$; $p=p_2$; $\rho=\rho_2$; $\mu=\mu_2$; $\lambda=0$; $\mu_p=0$ and $D=D_2$. In addition for $\phi \geq 0$: $\rho=\rho_1$, $\mu=\mu_1$, $\mu=\mu_1$, and $\mu_p=\mu_{p1}$. The governing equations for the two-phase flow and the boundary condition at the interface can then be re-written in the slightly simplified form as shown in equation (11)-(13) in which $\delta$ is the Dirac delta function.

By choosing the definitions listed in equations (14) it is possible to make the governing equations dimensionless. Wherein the primed quantities are dimensionless and L is the characteristic length, U is the characteristic velocity, $\rho_1$ is the density of the first fluid 204, $\lambda$ is the relaxation time and $\mu_1$ is the dynamic viscosity of the solvent in the first fluid 204. Substituting the definitions from equations (14) into equations (11)-(13), and dropping the primes, a new set of dimensionless governing equations is listed as equations (15)-(17). The coefficients such as: density ratio ($\rho$); viscosity ratio ($\mu$); normalized relaxation time ($\lambda$); Reynolds number of the solvent (Re); Weber number (We); and Reynolds number of the solute ($Re_p$) as used in equations (16) and (17) are defined in equations (18) and (19).

The interface 202 moves with the first fluid 204 and the second fluid 206. The evolution of the level set function $\phi$ is governed by an evolution equation (20).

Boundary Conditions and Contact Models

An embodiment of the present invention may simulate systems in which some of the boundaries are solid walls 210. In an embodiment of the present invention, it may be assumed that at the solid walls both the normal and tangential components of the velocity are substantially zero. An exception may be made at the second interface 208 at which the solid wall 210 meets both the first fluid 204 and the second fluid 206.

In an embodiment of the present invention, the boundary conditions may include inflow and outflow of one or both of the first fluid and the second fluid. The inflow and outflow of the fluid may be defined in terms of the velocity as in equation (21) or in terms of the pressure as shown in equation (22). Wherein $\hat{n}$ denotes the unit normal to the inflow or outflow boundary. Boundary conditions for the viscoelastic stresses, may be implemented using an extrapolation of the viscoelastic stresses ($\tau$).

An embodiment of the present invention may adopt the slipping contact model, as disclosed in U.S. Pat. No. 7,085,695, for the second interface 208 where the wall 210 meets both the first fluid 204 and the second fluid 206.

Governing Equations on Quadrilateral Mesh

Figure 3:
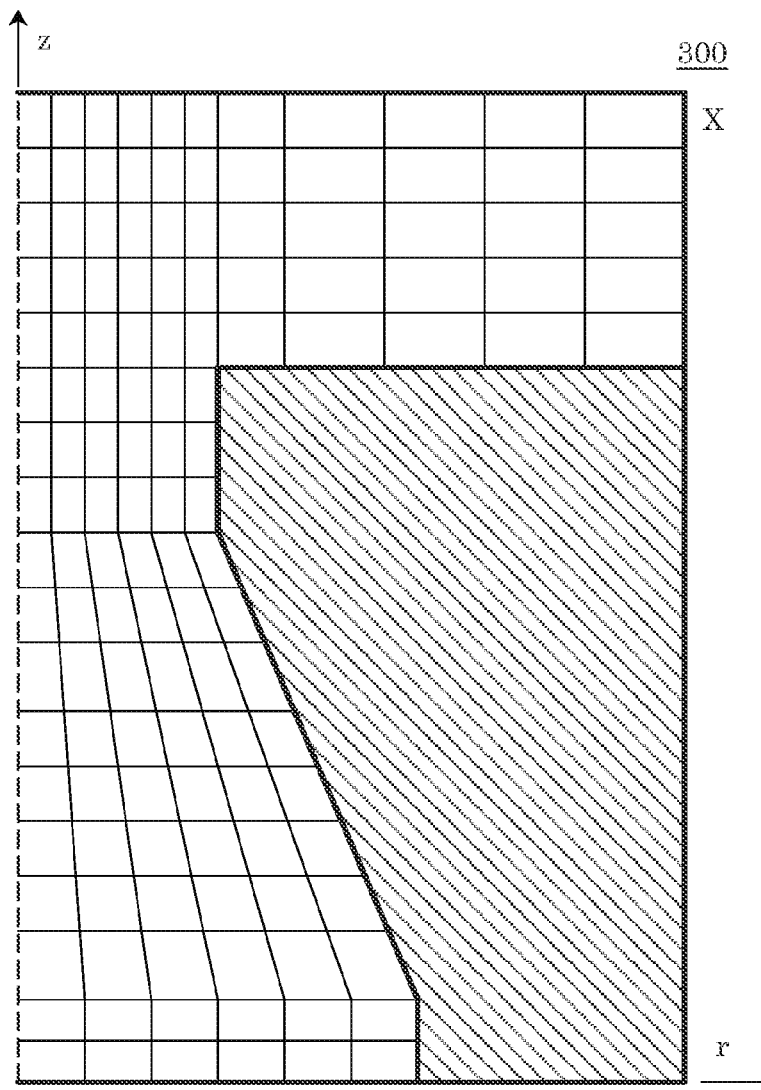
FIG. 3 is a quadrilateral body-fitted grid which may be used in an embodiment of the present invention.

An embodiment of the present invention may be used to simulate a system with reasonably complex geometries as shown in FIG. 3, for which a rectangular grid may not work well. Thus, there is a need for a general quadrilateral grid formulation. FIG. 3 is an illustration of a body fitted quadrilateral grid mesh 300 that has been fitted to the geometry of an ink jet nozzle 200. An embodiment of the present invention my include transforming the viscosity, surface tension, and viscoelastic stress terms from a quadrilateral mesh 300 to a rectangular mesh 400.

Figure 4:
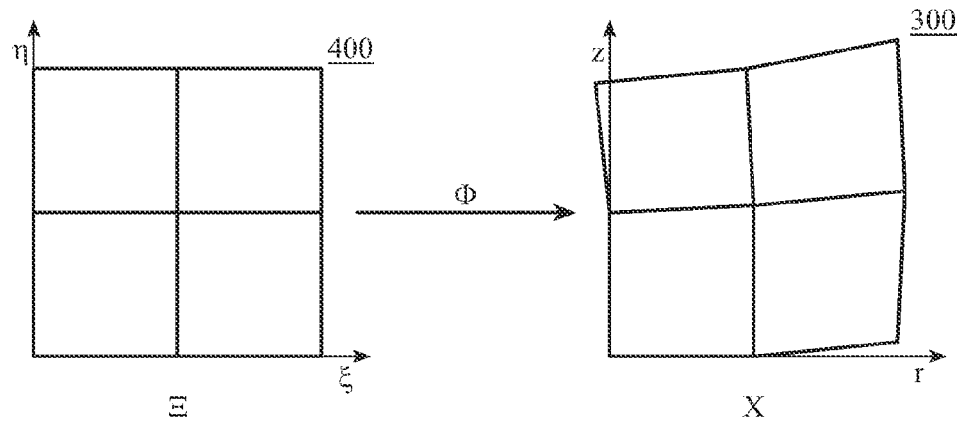
FIG. 4 is an illustration of an exemplarily mapping of a square grid to a body-fitted grid which may be used in an embodiment of the present invention.

A physical axi-symmetric space $X=(r,\theta,z)$ may contain a body-fitted quadrilateral mesh 300 such as the one illustrated in FIG. 3. As stated in equation (23) there may exist a transformation $\Phi$ which maps the grid points of the axially symmetric rectangular mesh in the computational space $\Xi=(\xi,\theta,\eta)$ (400) to those of a quadrilateral mesh in a physical axisymmetric space X (300) as illustrated in FIG. 4. Two things are needed in order to define the transformation $\Phi$: the Jacobian, which represents the volume change when a rectangular cell in the computational space is transformed to a quadrilateral cell; and the transformation matrix, which represents the cell distortion in the transformation. Equation (24) is the Jacobian for transformation $\Phi$. While equation (25) is a transformation matrix for the transformation $\Phi$. The coefficient g as used in equations (24) and (25) is defined as $g=2\pi r$ for axi-symmetric coordinate systems. For the convenience of future discussion, we also define the transformed convection velocity and transformed viscoelastic stress tensor in equations (26). The transformed convection velocity is also the flux of the fluid.

The pressure gradient found in the first term of equation (16) may be obtained by first calculating the pressure gradient in the computational space $\Xi$. The pressure gradient in the computational space $\Xi$ may than be transformed into the pressure gradient in the physical space X in the manner shown in equation (27). An individual skilled in the art would appreciate that equation (27) may be easily derived based on the chain rule. The divergence free continuity condition from equation (15) may be shown to be equation (28) when formulated in the computational space $\Xi$. A proof of this may be found by expanding equation (28) in the manner shown in equation (29) in which equation (25) has been substituted into equation (28).

Figure 6A:
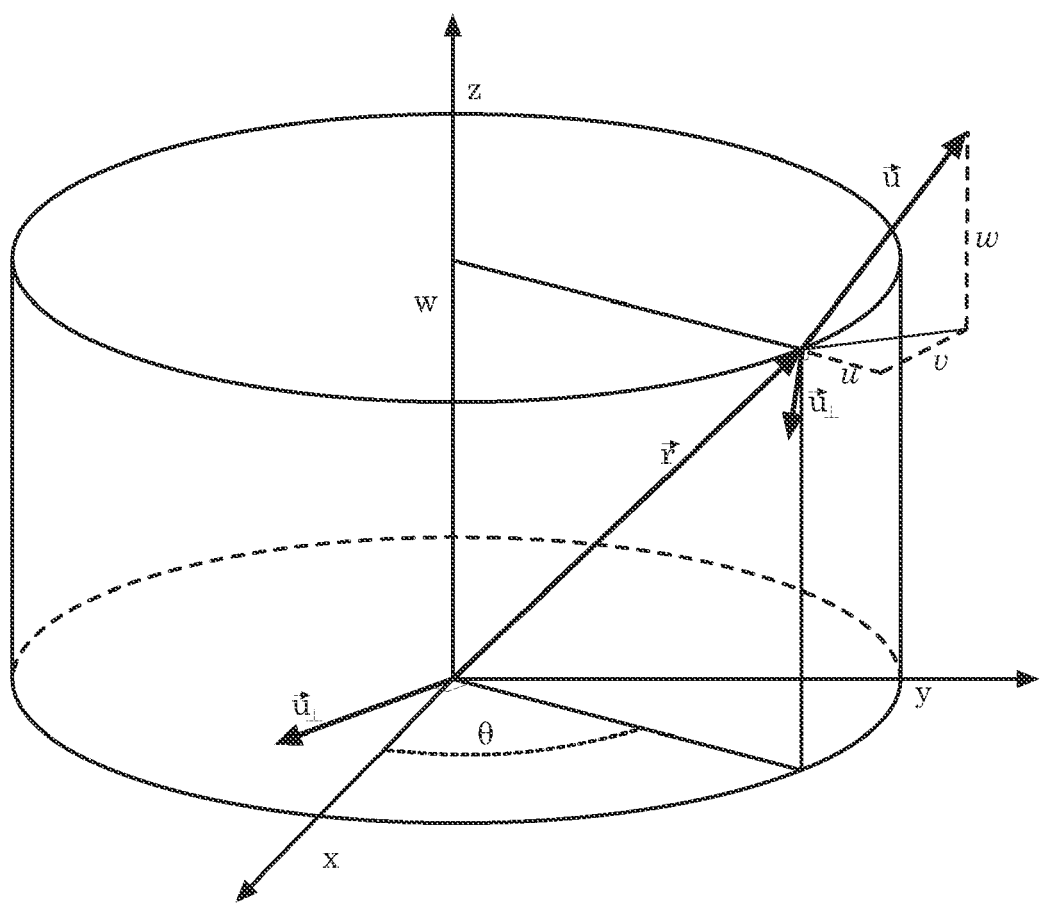
FIGS. 6A-6B are illustrations of an axially symmetric coordinate system, a Cartesian coordinate system, a velocity vector $\vec{u}$ and a velocity vector $\vec{u}_\perp$ that is orthogonal to the horizontal component of the velocity vector $\vec{u}$.
Figure 6B:
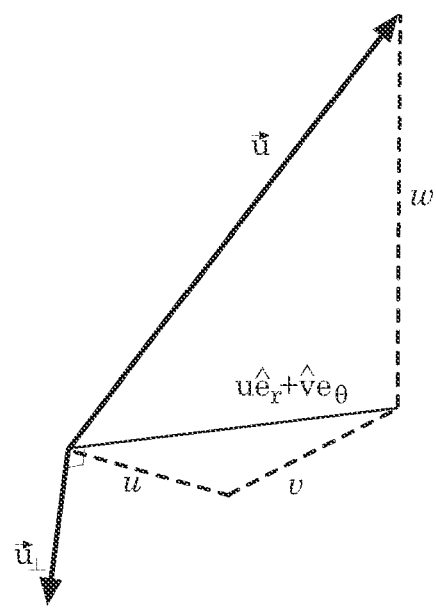

An individual skilled in the art would appreciate that by combining the transformations in (27) and (29), we can easily obtain the convection term as shown in equation (30) in which $\vec{u}_\perp = (-vu0)^T$. In the following discussion, the vector $\vec{u}_\perp$ is referred to as the orthogonal horizontal velocity vector. It is noted that $\vec{u}_\perp$ is always orthogonal to $\vec{u}$ because $\vec{u} \cdot \vec{u}_\perp = 0$. FIGS. 6A-6B are illustrations of the velocity vector $\vec{u}$ in both a Cartesian coordinate system and an axially symmetric coordinate system. FIGS. 6A-6B also show the orthogonal horizontal velocity vector $\vec{u}_\perp$. The convection term in the level set evolution equation (20) may be transformed in the manner shown in equation (31). FIG. 6B is a graphical illustration of the vector $\vec{u}_\perp$ and it's relationship to the vector $\vec{u}$.

Equation (32) is an expansion of the viscosity term found in equation (16) for two-phase flow. An individual skilled in the art would appreciate that equation (33) is true for any differentiable velocity field $\vec{u}$. Based on equation (33) the last term of the viscosity term as presented in equation (32) may be dropped. Equation (34) is the viscosity term described mostly in the computational space $\Xi$ with the last term dropped in accordance with equation (33). The last term of equation (34) is not described in the computational space, but is described below. The matrix $I_0$ as used in equation (34) is defined in equation (35). Please note that the $2u/r\hat{e}_\theta\hat{e}_\theta$ term has been omitted from the second half of the dot product listed in equation (34). This may be done because the lack of an azimuthal component $\hat{e}_\theta$ in the first half of the dot product makes the contribution due to of $2u/r\hat{e}_\theta\hat{e}_\theta$ zero.

Equation (34) includes a spatial derivative of the viscosity. For systems in which the viscosity is constant such as single phase flow this term vanishes. However, it plays an important role for two phase flow system such as those used by an embodiment of the present invention.

Equation (36) is a useful formulation of the vector Laplacian operator when applied to the fluid velocity vector $\vec{u}$ in an axi-symmetric coordinate system. Equation (37) describes the transformation of the matrix in equation (36) from the physical space X to the computational space $\Xi$. Equation (38) shows how the divergence in equation (36) may be transformed. Equations (37) and (38) may be used to complete the transformation of equation (36) to give us equation (39). By combining equations (34) and (39) we get the viscosity term (32) in the computational space giving us equation (40).

Curvature and Surface Tension

An embodiment of the present invention may define the level set function as being function of the radial and axial coordinates and independent of the azimuthal coordinates, $\phi \equiv \phi(r,z)$. It is seen that the derivate of the level set function relative to the azimuth is zero, $\partial\phi/\partial\theta = 0$. The curvature $\kappa$ of the interface 202 may be defined solely in terms of the level set function as shown in equation (10). Equations (27) and (28) may be used to transform equation (10) into equation (41) as a formulation of the curvature $\kappa$ in the computational space.

The surface tension term, which is the third term in equation (16) may be transformed into computational space as shown in equation (42) using equation (41).

Divergence of Viscoelastic Stress Tensor

The viscoelastic stress tensor $\tau$ is a 3×3 matrix that is representative of the viscoelastic stress experienced by the fluids. Equation (43) is representative of the divergence of the stress tensor $\tau$ and its representation in the computational space $\Xi$.

Upper-Convected Derivative Terms

The convection term in the upper-convected derivative is formulated in the computational space $\Xi$ as shown in equation (44) in which the last matrix term is defined in equation (45). The convection term of the upper-convected derivate is proportional to the directional derivative of the stress tensor along the direction of the fluid velocity. As shown in equation (44) the convection term may be divided into two parts. The first part describes how the stress tensor $\tau$ changes in the radial and axial directions of the computational space $\Xi$. Please note that the gradient in the computational space $\Xi$ as used in equation (44) does not include the azimuthal component. The second part of the convection term is proportional to the partial derivative of the stress tensor relative to the azimuth. The second part of the convection term is also proportional to the velocity of the fluid and inversely proportional the radius.

The partial derivative of the stress tensor $\tau$ along the azimuth $\theta$ is defined as the tensor $\tau_V$ and is described in equation (45). An analytical solution to the partial derivate of stress in a fluid simulation is generally not known. It is typically necessary to calculate this partial derivate numerically by doing an expansion in the computational space. The inventor has found that a means for calculating $\tau_V$, which is described in equation (45), that does not include an expansion in the computational space.

The second term of the upper-convected derivate is defined in equation (46) in the computational space $\Xi$, in which matrix terms used in equation (46) are defined in equation (47).

Combining equations (29) to (47), we obtain the governing equations (48) and (51) on the quadrilateral grid $\Xi$. The viscosity term as used in equation (48) is defined in equation (40).

Equations (27) to (51) are derived for the quadrilateral grid in a generalized axi-symmetric coordinate system. The embodiment of the present invention described above does not include the effect of gravity. An individual skilled in the art would appreciate that adding the effect of gravity would substantially change the present invention as recited in the claims.

Numerical Algorithms

Temporal Discretization

In the equations described below the superscript n (or n+1) is used to denote the time step, an example of which is described in equation (52). Given the quantities $\vec{u}^n$, $p^{n-1/2}$, $\phi^n$, and $\tau^n$ the purpose is to obtain $\vec{u}^{n+1}$, $p^{n+1/2}$, $\phi^{n+1}$, and $\tau^{n+1}$. The semi-implicit algorithm described below is second-order accurate in both time and space.

The boundary condition on the nozzle wall may be based on a contact model. The inflow pressure p of one or both fluids at a time $t^{n+1}$ may be given by an equivalent circuit. The temporal discretization is independent of the coordinate system or grids being used. The governing equations in vector notation (i.e. (15), (16), (17), and (20)) will be used below to explain temporal discretization. Evaluating individual terms on quadrilateral grids will be explained later.

Level Set Update

The level set $\phi$ is updated using the time discretized equation shown in equation (53). Equation (53) includes a time-centered advection term $[\vec{u}\cdot\nabla\phi]^{n+1/2}$, which may be evaluated using an explicit predictor-corrector scheme that requires only data available at a time $t^n$. Once the level set $\phi$ at a time step n+1 is obtained ($\phi^{n+1}$), the level set $\phi$ at a half time step ($\phi^{n+1/2}$) is computed by using an update rule in equation (54) based on a temporal average.

Semi-Implicit Time Integration for Momentum Equations

For a semi-implicit temporal scheme, we first calculate an intermediated velocity of the fluid $\vec{u}^{**}$ as shown in equation (55) which may be derived from equation (16). It is useful to define a velocity predictor $\vec{u}^*$ as shown in equation (56). The term D* as used in equation (56) is defined in equation (57). After the intermediate velocity $\vec{u}^{**}$ is calculated using (55), $\vec{u}^*$ can be obtained by inverting the equation (56).

As described in equation (58) the velocity predictor is then adjusted by adding a term proportional to the pressure gradient. Finally the projection equation (59) is solved by enforcing the incompressibility condition of equation (15) at time $t^{n+1}$.

A second-order explicit Godunov method for the advection term in equation (55). The central difference method is used for the viscosity term and the surface tension term in equation (55). The viscoelastic stress term is evaluated at the time $t^{n+1}$. The time-centered cell edge viscoelastic stress terms are obtained by using a Taylor's expansion and Godunov upwinding. The central difference method may then be employed to evaluate the divergence of the viscoelastic stress tensor $\tau$.

Projection for $\vec{u}^{n+1}$

By applying the divergence operator to both sides of equation (59) the incompressibility condition of equation (15) may be satisfied at time step n+1. Which gives us equation (60), since $\nabla\cdot\vec{u}^{n+1}=0$. Once the pressure $p^{n+1/2}$ is calculated from equation (60), then the velocity field $\vec{u}^{n+1}$ can be obtained by using equation (59).

To simplify the implementation for arbitrary geometries, a finite element projection is used such as the one stated in equation (61). The function $\psi$ is the finite element weighting function. The surface $\Gamma_1$ is representative of the boundary in which fluid flows in and out of the simulation space. The function $\vec{u}^{BC}$ is the velocity of the fluid at the boundary. The space $\Omega$ is the volume of space to be simulated. The divergence theorem may be used to show that a boundary condition at the surface $\Gamma_1$ is equation (62).

The choice of the weighting function $\psi$, as well as the approximation for the pressure p and velocity $\vec{u}$, is flexible. In an embodiment of the invention, the weighting function $\psi$ and the pressure p are chosen to be piecewise bilinear, and the velocity $\vec{u}$ is chosen to be piecewise constant.

Mixed Algorithm for the Viscoelastic Stresses

Equation (63) may be used in an algorithm to integrate the viscoelastic stress in time that is: explicit with the advection term; semi-implicit with the viscosity term; and implicit with the relaxation term. In equation (63) the terms $\vec{u}^{n+1/2}$ and $\tau^{n+1/2}$ are the time-centered cell edge velocity and the time centered viscoelastic stress, both of which may be determined by a Taylor's expansion along with Godunov upwinding. A rearrangement of equation (63) gives us equation (64) in which the viscoelastic stress tensor $\tau$ at time step n+1 in terms of quantities at time step n and time step n+½.

Re-Initialization of the Level Set Function

The interface $\Gamma$ between the first fluid and the second fluid is implicitly described by the level set function $\phi$. In order to calculate the surface tension of the interface $\Gamma$ it is important that the level set function $\phi$ remain a signed distance function to the interface $\Gamma$ as time evolves. However, if we update the level set $\phi$ using equation (53), it will not remain as such for long. A preferred embodiment of the present invention periodically stops the simulation and recreates a new level set function $\phi$ which is a signed distance function, such that $|\nabla\phi|=1$, without changing the position of the interface zero level set $\Gamma$. Several level set re-initialization algorithms are discussed in the prior art including U.S. Pat. No. 7,254,523, and U.S. patent application Ser. No. 11/398,775, which are hereby incorporated by reference.

Spatial Discretization

The following embodiment of the present invention will be described in terms of generalized axisymmetric viscoelastic fluid flows. Equations (65) define the terms constraints of the simulation. The velocity vector $\vec{u}$ and the viscoelastic stress tensor $\tau$ include azimuthal terms. Prior art methods did not include azimuthal terms.

Figure 7A:
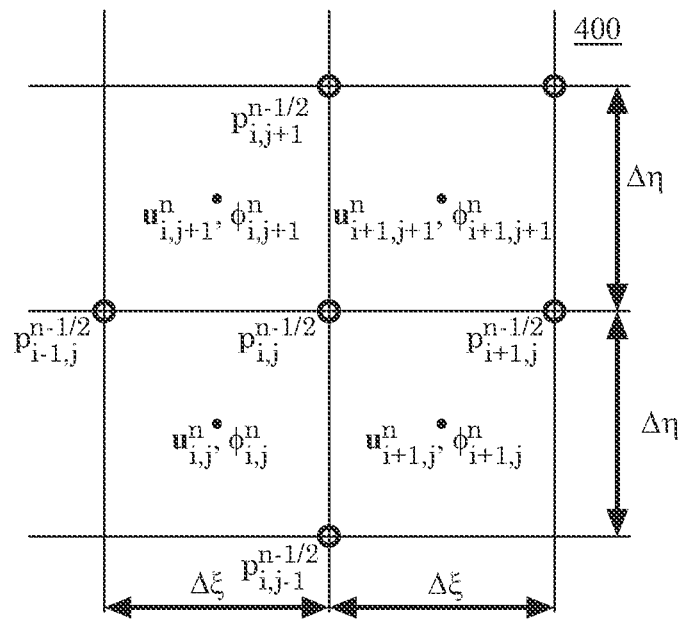
FIGS. 7A-7B are illustrations of a computational grid and the location of variables being simulated.
Figure 7B:
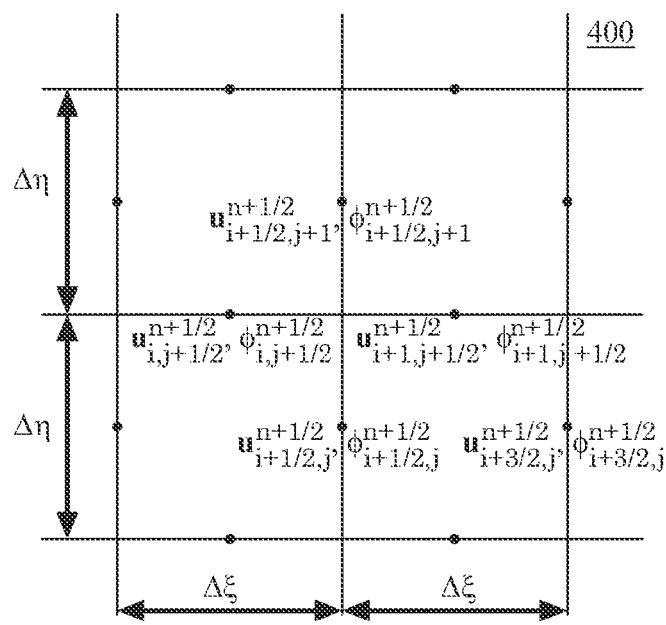

FIG. 7A is an illustration of a portion of the grid 400 in which the relative locations of various system variables is illustrated. As shown in FIG. 7A, the velocities $\vec{u}_{i,j}{}^n$, and the level set $\phi_{i,j}{}^n$ are located at the cell centers. Although not shown in FIG. 7A the viscoelastic stresses $\tau_{i,j}{}^n$ are also located at the cell centers. FIG. 7A also shows that the pressure $p_{i,j}{}^{n-1/2}$ is calculated at the grid points. FIG. 7B illustrates the time-centered edge velocities $\vec{u}_{i+1/2,j}{}^{n+1/2}$, and the time-centered level set values $\phi_{i+1/2,j}{}^{n+1/2}$, which are also referred to as predictors. These predictors are located at the middle point of cell edges as shown in FIG. 7B. Although not illustrated in FIG. 7B the time-centered edge viscoelastic stresses $\tau_{i+1/2,j}{}^{n+1/2}$ are also located at the middle point of the cell edges.

The Quadrilateral Grid

Figure 5:
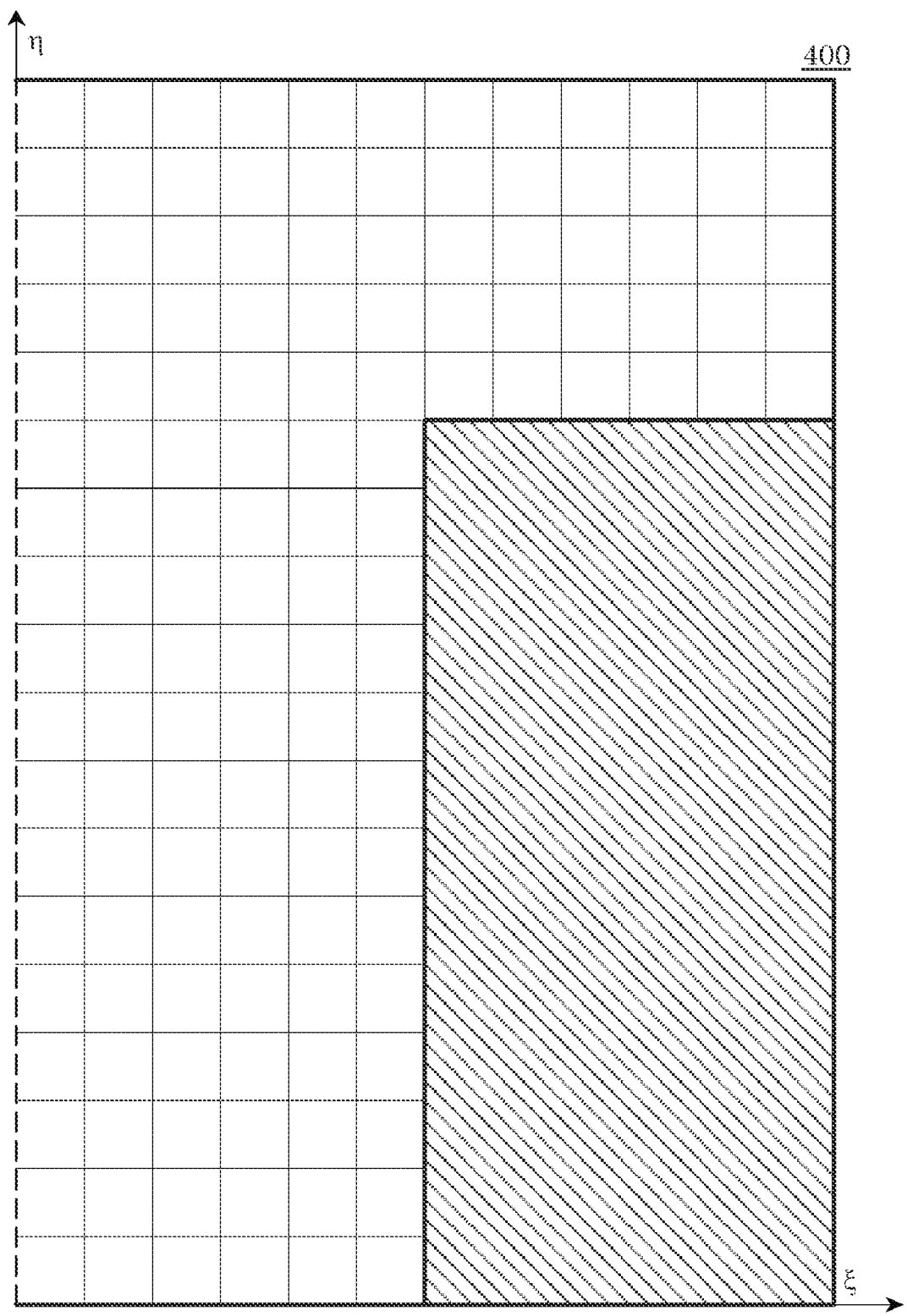
FIG. 5 is an illustration of a square computational grid which may be used in an embodiment of the present invention.

An embodiment of the present invention makes use of the transformation $X=\Phi(\Xi)$, equation (23). This transformation $\Phi$ transforms a physical space X to a quadrilateral space $\Xi$ as shown in FIG. 4. In a preferred embodiment of the present invention the grid of the computational space $\Xi$ is composed of unit squares, i.e. the grid in the computational space $\Xi$ has $\Delta\xi=\Delta\eta=1$. The boundary-fitted quadrilateral grid 300 and the nozzle wall in FIG. 3 are mapped to the uniform computational grid 400 and the rectangular hatched area as illustrated in FIG. 5.

Equation (66) exemplifies how the coordinates at the cell centers in the physical space X may be defined, namely as an average of the cell nodes. As used in the following discussion, variables with two subscripts define relative grid points. In an embodiment of the present invention, each node may be associated with two or more coordinates which define a point in the physical space X.

In an embodiment of the present invention, the elements of the transformation matrix T at the cell centers may be defined in terms of the differences of the grid points as shown in equation (67). The transformation does not need to be defined globally. An embodiment of the present invention may use a local definition defined at each cell center.

The Advection Terms in Momentum and Level Set Equations

A method of calculating advection terms in a momentum calculation and a level set calculation may be based on an un-split second order Godunov method. An embodiment of the invention may use a cell-centered predictor corrector scheme. The corrector step in the predictor corrector scheme may evaluate equations (68) and (69).

In equations (68) and (69), the time-centered edge velocities and edge level sets (the predictors) are obtained using a Taylor's expansion. The time derivatives $\vec{u}_t^n$ and $\phi_t^n$ are substituted by the momentum equations and the level set convection equation. The time centered edge velocity $\vec{u}_{i+1/2,j}^{n+1/2}$ is calculated from both sides of the edge. Godunov type upwinding is used to decide which extrapolation to use. The other time-centered edge values can be calculated using a similar method.

Equation (70) is the time centered edge velocity as extrapolated from the left. The term $\vec{F}_{i,j}^n$ is stated in equation (71). Equation (72) is the time centered edge velocity as extrapolated from the right. In an embodiment of the present invention the normal slopes $\vec{u}_{\xi,i,j}^n$ may be evaluated using a monotonicity limited central difference method as described in equations (80)-(83) which are described below. The limiting is done on each component of the velocity at $t^n$ separately. The transverse derivative term $(\overline{w}\vec{u}_\eta)_{i,j}^n$ may be evaluated using an upwind scheme.

As stated above Godunov upwinding is used to decide which extrapolation to use. The transformed edge velocity is calculated using a natural extension of equation (25), $\vec{u}_{i+1/2,j}^{n+1/2}=(gT\vec{u})_{i+1/2,j}^{n+1/2}$. The decision process for choosing between the right and left transformed edge velocities is described in equation (73).

The transformed edge velocities may not be divergence-free. An intermediate marker and cell (MAC) projection may be used to make the normal edge velocities divergence-free. Given a relatively smooth function q, and the edge velocities $\vec{u}^e$ obtained using equations (70)-(73) we can create an equation (75) that is divergence free. By taking the divergence of equation (75) we get equation (76). On quadrilateral grids, the MAC projection in equation (76) is given in equation (77). The boundary conditions for q as used in equation (77) are similar to those for the pressure p. At the outflow of the simulation q may be defined as zero, q=0. At the inflow, we may define equation q as in equation (78). After a solution to q has been found the edge velocity may be transformed using equation (79). Thus the function q is used to reduce the divergence of the velocity. The normal component of the transformed edge velocities is then employed to decide the time centered edge centered velocities and level set values as in equation (74).

Evaluation of the Normal Derivatives

The normal derivatives $(\vec{u}_\xi)_{i,j}^n$ in equations (70) and (72) are evaluated using a monotonicity-limited central difference method for each term in the vector. Monotonicity-limited central difference methods as used in a preferred embodiment of the present invention limits the rate that the slope changes. In the following equation the superscript $n$ is omitted so as to simplify the equations. The central difference $D^c$, the forward difference $D^+$, and the backward difference $D^-$ are first calculated as shown in equation (80). These differences are used to define the limited slope $\delta_{lim}$ as shown in equation (81). The vector terms of the normal derivate are calculated in the manner shown from second-order limited slope as shown in equation (81).

Evaluation of the Tangential Derivatives

In an embodiment of the present invention the tangential derivate $(\overline{w}\vec{u}_\eta)_{i,j}^n$ as used in equations (70) and (72) is calculated using an upwind scheme such as the one described in equation (83). Using an upwind scheme to calculate the tangential derivate improves the stability of the algorithm.

Evaluation of the Last Term in Equation (67)

An embodiment of the present invention may evaluate the last term of equation (68) by averaging the time-centered edge velocities as shown in equation (84).

The Viscosity Term

We need to discretize the viscosity term in (71), the form of which in the computational space is defined in (40). The discretization of the first part of the viscosity term (40) is done by central differencing for all the derivatives and by simple averaging for the last term. The Laplacian in the computational space may be calculated using equation (85) in which the terms used in equation (84) are calculated in equations (86).

Each term in equations (85) is discretized using central differences with coefficients computed by averaging elements of the transformation matrix. Equation (87) is an example of how an embodiment of the present invention may calculate the first term in equation (85). The rest of the terms in equation (84) may be calculated in a similar manner.

Spacial Discretizations of Viscoelastic Stress Equations Evaluation of the Advection Term Referring to FIG. 7A the viscoelastic stress tensor $\tau_{i,j}^n$ is co-located at the cell centers along with the velocity and level set values. Referring to FIG. 7B the time-centered viscoelastic stress tensor $\tau_{i+1/2,j}^{n+1/2}$, which may be thought of as a viscoelastic stress predictor, is co-located at the middle point of each edge along with the time-centered velocity and time-centered level set values. The time centered advection term in the viscoelastic stress equation may be evaluated using equation (88) which can be simply derived from equation (44) in the computational space.

An embodiment of the present invention may employ equation (88) as the corrector step in a predictor corrector scheme. The time-centered edge stress tensor $\tau^{n+1/2}$ is obtained by doing a Taylor expansion on $\tau$ in both space and time. The time derivative $\tau_t^n$ at time step n may be substituted by the viscoelastic stress equation (49). Evaluating the time centered stress tensor may include extrapolating from both sides of the edge and then applying a Godunov type upwinding to decide which extrapolation to use.

Equation (89) may be used to extrapolate from the left. The matrix G as used in equation (89) is defined in equation (90). Equation (91) may be used to extrapolate from the right. A method employing monotonicity-limited central differences may be used to evaluate the normal slopes of the stress tensor $\tau$. The method of employing monotonicity-limited central differences for the stress tensor $\tau$ is similar to the process described in equations (80)-(82). In an embodiment of the present invention the normal slope of the stress tensor is $\tau_\xi$ or $\tau_\eta$. If extrapolation is done from the left and the right than the normal slope is $\tau_\xi$. While if we do extrapolation from above and below than the normal slope is $\tau_\eta$. The limiting is done on each component of the viscoelastic stress tensor at each full time step. The transverse derivative term $(\overline{w\tau_\eta})_{i,j}$ may be evaluated by using an upwinding method.

Choosing which time centered stress tensor extrapolation to use may be based on a rule such as the one described in equation (92). The left hand extrapolation (89) is used if the transformed convection velocity in the computational space is positive. The right hand extrapolation (91) is used if the transformed convection velocity in the computational space if negative. An average of the right and left extrapolation is used if the transformed convection velocity in the computational space is zero.

The time centered stress tensor as calculated using the decision tree shown in equation (92) is used in equation (88) to calculate the convection term in the viscoelastic stress equation. The last term in equation (88) may be calculated by taking a local spatial average of the four time-centered edge velocities and stresses as shown in equation (93)

Evaluation of Other Upper-Convected Derivative Terms

The other terms of the upper-convected derivate (49) may all be evaluated in a similar manner. The following is how the first term (94) of the upper-convected derivative (49) may be evaluated in the computational space using time-centered cell edge velocities and viscoelastic stress tensor.

The cell centered time-centered stress tensor may be evaluated by taking a spatial average of the four local edge centered time-centered stress tensors as shown in equation (95). The first term in the parentheses of equation (94) may be calculated using the equation (96). The time centered spatial derivatives of the fluid velocity may be is calculated by central differences in the manner shown in equation (97). The second and third terms in the parentheses of equation (94) may be evaluated in a similar manner. Equation (98) is an example of how the second term may be evaluated by averaging the time centered edge velocities.

The Divergence of Viscoelastic Stresses

The divergence of the time centered viscoelastic stresses as used in the fifth term of equation (55) may be evaluated using equation (99). The divergence of the cell-centered time centered stress tensor may be calculated using the central difference method along with edge centered time centered stress tensors. The cell centered time centered vector which is the last term of equation (99), may be approximated by averaging edge centered time centered vector quantities. The cell edge transformation matrices may be approximated with a spatial average of two of the neighboring cell centered transformation matrices as shown in equation (100). Please note that in the embodiment of the present invention described here the transformation matrices are time independent. An individual skilled in the art would appreciate how to implement the invention if the transformation matrices evolved along with the rest of the simulation.

Thickness of the Interface

Because of the numerical difficulty caused by evaluating the Dirac delta function and by the sharp change of $\rho$ and $\mu$ across the interface 202, A smoothed Heavyside function may take the form of equation (101). The Dirac delta function may be redefined as the derivative of the smoothed Heavyside function as in equation (102). The thickness parameter $\epsilon$ is defined in equation (103) and is related to the average mesh size. Alternatively, the thickness parameter $\epsilon$ may be related to the smallest mesh size. The scaling parameter $\alpha$ as used in equation (103) may take the range of approximately 1.5 to 2. As the mesh size decreases so does the thickness of the interface 202. Nonetheless, for any numerically practical choices, the interface 202 will necessarily have some smearing.

Constraint on Time Step

An embodiment of the present invention in which the time integration scheme is higher order explicit and may include a constraint on time step $\Delta t$ as determined by a Courant-Friedrichs-Lewy (CFL) condition such as the one described in equation (104). In which h=min($\Delta r$, $\Delta z$) and $\vec{F}$ is defined in equation (71).

Results

Figure 8A:
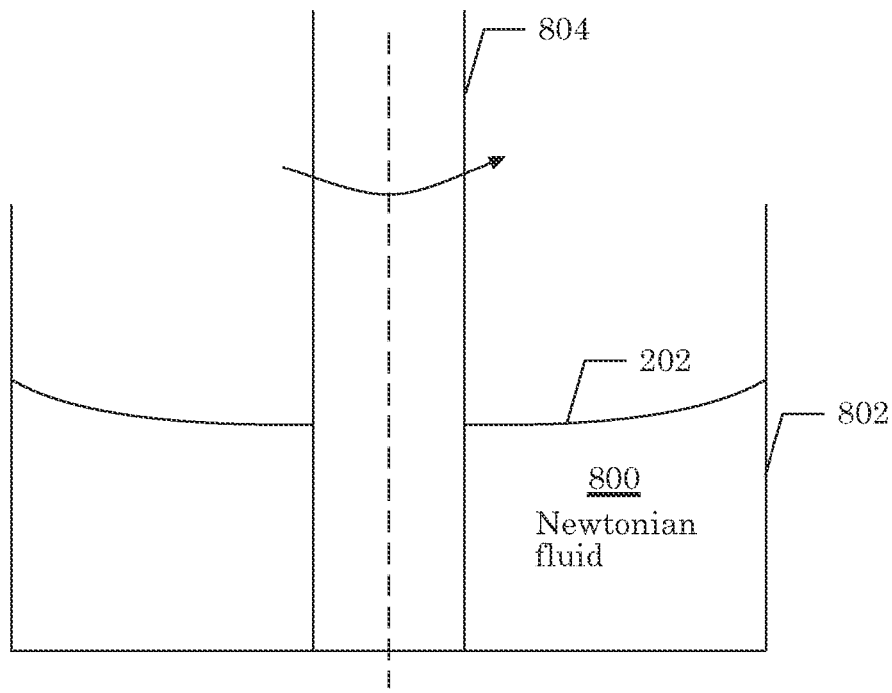
FIGS. 8A-8B are illustrations of the interface of a rotating Newtonian fluid and a rotating viscoelastic fluid.

FIG. 8A is an illustration of a Newtonian fluid 800. The Newtonian fluid 800 is in a cylinder 802. The cylinder includes a rotating rod 804. As the Newtonian fluid 800 rotates the fluid 800 is pushed towards the outer edge of the cylinder 802 by centrifugal forces. The increased volume of fluid 800 along the edge of the cylinder forces the interface 202 to rise along the outer edge of the cylinder.

Figure 8B:
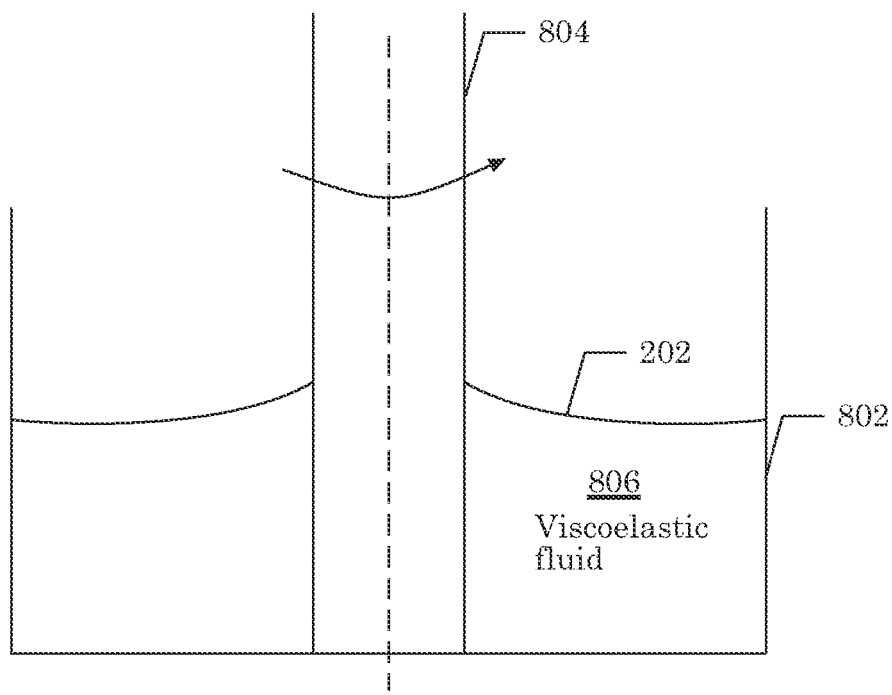

FIG. 8B is an illustration of rod climbing behavior also known as the Weissenberg effect in which a viscoelastic fluid 806 is placed in a container 802 with a rotating rod 804. Unlike the Newtonian fluid the viscoelastic fluid 806 climbs the rod. The present invention is an effective means for simulating systems such as those illustrated in FIG. 8B.

System

Figure 9:
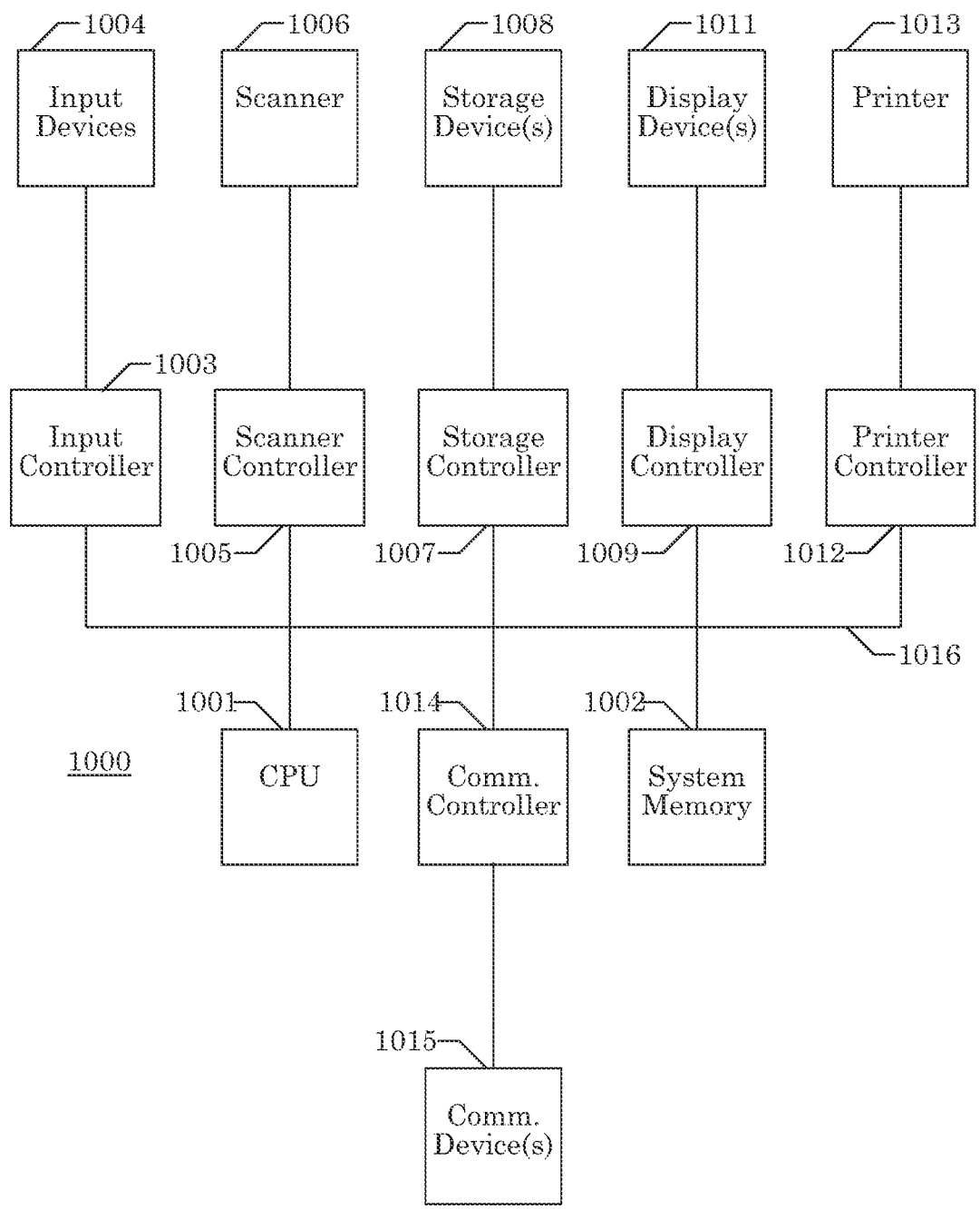
FIG. 9 is a schematic diagram of an exemplary system that may be used to implement embodiments of the invention.

Having described the details of the invention, an exemplary system 1000, which may be used to implement one or more aspects of the present invention will now be described with reference to FIG. 9. As illustrated in FIG. 9, the system includes a central processing unit (CPU) 1001 that provides computing resources and controls the computer. The CPU 1001 may be implemented with a microprocessor or the like, and may also include a graphics processor and/or a floating point coprocessor for mathematical computations. The system 1000 may also include system memory 1002, which may be in the form of random-access memory (RAM) and read-only memory (ROM).

A number of controllers and peripheral devices may also be provided, as shown in FIG. 9. An input controller 1003 represents an interface to various input device(s) 1004, such as a keyboard, mouse, or stylus. There may also be a scanner controller 1005, which communicates with a scanner 1006. The system 1000 may also include a storage controller 1007 for interfacing with one or more storage devices 1008 each of which includes a storage medium such as magnetic tape or disk, or an optical medium that might be used to record programs of instructions for operating systems, utilities and applications which may include embodiments of programs that implement various aspects of the present invention. Storage device(s) 1008 may also be used to store processed data or data to be processed in accordance with the invention. The system 1000 may also include a display controller 1009 for providing an interface to a display device 1011, which may be a cathode ray tube (CRT), or a thin film transistor (TFT) display. The system 1000 may also include a printer controller 1012 for communicating with a printer 1013. A communications controller 1014 may interface with one or more communication devices 1015 which enables the system 1000 to connect to remote devices through any of a variety of networks including the Internet, a local area network (LAN), a wide area network (WAN), or through any suitable electromagnetic carrier signals including infrared signals.

In the illustrated system, all major system components may connect to a bus 1016, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including magnetic tape or disk or optical disc, or a transmitter, receiver pair.

The present invention may be conveniently implemented with software. However, alternative implementations are certainly possible, including a hardware implementation or a software/hardware implementation. Any hardware-implemented functions may be realized using ASIC(s), digital signal processing circuitry, or the like. Accordingly, the "means" terms in the claims are intended to cover both software and hardware implementations. Similarly, the term "machine-readable medium" as used herein includes software, hardware having a program of instructions hardwired thereon, or a combination thereof. With these implementation alternatives in mind, it is to be understood that the figures and accompanying description provide the functional information one skilled in the art would require to write program code (i.e., software) or to fabricate circuits (i.e., hardware) to perform the processing required.

In accordance with further aspects of the invention, any of the above-described methods or steps thereof may be embodied in a program of instructions (e.g., software), which may be stored on, or conveyed to, a computer or other processor-controlled device for execution on a computer readable medium. Alternatively, any of the methods or steps thereof may be implemented using functionally equivalent hardware (e.g., application specific integrated circuit (ASIC), digital signal processing circuitry, etc.) or a combination of software and hardware.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

$$\frac{d\tau}{dt} + \frac{G}{\mu}\tau = s \tag{1}$$

$$\tau = \mu s \tag{2}$$

$$\rho_1 \frac{D\vec{u}_1}{Dt} = -\nabla p_1 + \nabla \cdot (2\mu_1 D_1) + \nabla \cdot \tau_1 \tag{3}$$

$$\nabla \cdot \vec{u}_1 = 0$$

$$\frac{D\tau_1}{Dt} = \tau_1 \cdot (\nabla \vec{u}_1) + (\nabla \vec{u}_1)^T \cdot \tau_1 - \frac{1}{\lambda_1}(\tau_1 - 2\mu_{p1} D_1)$$

$$\rho_2 \frac{D\vec{u}_2}{Dt} = -\nabla p_2 + \nabla \cdot (2\mu_2 D_2) \tag{4}$$

$$\nabla \cdot \vec{u}_2 = 0$$

$$D_i = \frac{1}{2}\left[\nabla \vec{u}_i + (\nabla \vec{u}_i)^T\right] \qquad i = 1, 2 \tag{5}$$

$$\vec{u}_i = u_i(r,z)\hat{e}_r + v_i(r,z)\hat{e}_\theta + w_i(r,z)\hat{e}_z \quad i = 1,2$$

$$\frac{D\vec{u}_i}{Dt} = \left[\frac{\partial}{\partial t} + (\vec{u}_i \cdot \nabla)\right]\vec{u}_i \tag{6}$$

$$\frac{D\tau_1}{Dt} - \tau_1 \cdot (\nabla \vec{u}_1) - (\nabla \vec{u}_1)^T \cdot \tau_1 \tag{7}$$

$$(2\mu_1 D_1 - 2\mu_2 D_2) \cdot \hat{n} = (p_1 - p_2 + \sigma\kappa)\hat{n} \tag{8}$$

$$\hat{n} = \frac{\nabla\phi}{|\nabla\phi|}\bigg|_{\phi=0} \tag{9}$$

$$\kappa = \nabla \cdot \hat{n} = \nabla \cdot \left(\frac{\nabla\phi}{|\nabla\phi|}\right)\bigg|_{\phi=0} \tag{10}$$

$$\nabla \cdot \vec{u} = 0 \tag{11}$$

$$\rho(\phi)\frac{D\vec{u}}{Dt} = -\nabla p + \nabla \cdot (2\mu(\phi)D) + \nabla \cdot \tau - \sigma\kappa(\phi)\delta(\phi)\nabla\phi \tag{12}$$

$$\frac{D\tau}{Dt} = \tau \cdot (\nabla \vec{u}) + (\nabla \vec{u})^T \cdot \tau - \frac{1}{\lambda(\phi)}(\tau - 2\mu_p(\phi)D) \tag{13}$$

$$x = Lx' \qquad y = Ly' \qquad t = \frac{L}{U}t' \tag{14}$$

$$p = \rho_1 U^2 p' \quad \vec{u} = U\vec{u}' \quad \tau = \rho_1 U^2 \tau'$$

$$\rho = \rho_1 \rho' \qquad \mu = \mu_1 \mu' \quad \lambda = \frac{L}{U}\lambda' \qquad \mu_p = \mu_1 \mu'_p$$

$$\nabla \cdot \vec{u} = 0 \tag{15}$$

$$\frac{D\vec{u}}{Dt} = \tag{16}$$

$$-\frac{1}{\rho(\phi)}\nabla p + \frac{1}{\rho(\phi)\mathrm{Re}}\nabla \cdot (2\mu(\phi)D) - \frac{1}{\rho(\phi)We}\kappa(\phi)\delta(\phi)\nabla\phi + \nabla \cdot \tau$$

$$\frac{D\tau}{Dt} = \tau \cdot (\nabla \vec{u}) + (\nabla \vec{u})^T \cdot \tau - \frac{1}{\lambda(\phi)}\left(\tau - 2\frac{\mu_p(\phi)}{\mathrm{Re}_p}D\right) \tag{17}$$

$$\rho(\phi) = \begin{cases} 1 & \phi \geq 0 \\ \dfrac{\rho_2}{\rho_1} & \phi < 0 \end{cases} \tag{18}$$

$$\lambda(\phi) = \begin{cases} \lambda & \phi \geq 0 \\ 0 & \phi < 0 \end{cases}$$

$$\mu(\phi) = \begin{cases} 1 & \phi \geq 0 \\ \dfrac{\mu_2}{\mu_1} & \phi < 0 \end{cases}$$

$$\mu_p(\phi) = \begin{cases} \dfrac{\mu_{p1}}{\mu_1} & \phi \geq 0 \\ 0 & \phi < 0 \end{cases}$$

$$\mathrm{Re} = \frac{\rho_1 U L}{\mu_1}, \; \mathrm{Re}_p = \frac{\rho_1 U L}{\mu_{p1}}, \; We = \frac{\rho_1 U^2 L}{\sigma} \tag{19}$$

$$\frac{\partial \phi}{\partial t} + \vec{u} \cdot \nabla \phi = 0 \tag{20}$$

$$\vec{u} = \vec{u}^{BC} \tag{21}$$

$$p = p^{BC}, \; \frac{\partial \vec{u}}{\partial \hat{n}} = 0 \tag{22}$$

$$X = \Phi(\Xi) \tag{23}$$

$$J = g \det \nabla_\Xi \Phi = g \det \begin{pmatrix} r_\xi & 0 & r_\eta \\ 0 & 1 & 0 \\ z_\xi & 0 & z_\eta \end{pmatrix} = 2\pi r(r_\xi z_\eta - r_\eta z_\xi) \tag{24}$$

$$T = \frac{J}{g}[\nabla_\Xi \Phi]^{-1} = \begin{pmatrix} z_\eta & 0 & -r_\eta \\ 0 & \dfrac{J}{g} & 0 \\ -z_\xi & 0 & r_\xi \end{pmatrix} \tag{25}$$

$$\vec{u}(\Xi) = gT\vec{u}(X) \tag{26}$$
$$\tau(\Xi) = gT\tau(X)$$

$$\nabla p = \begin{pmatrix} p_r \\ 0 \\ p_z \end{pmatrix} = \begin{pmatrix} p_\xi \xi_r + p_\eta \eta_r \\ 0 \\ p_\xi \xi_z + p_\eta \eta_z \end{pmatrix} \tag{27}$$
$$= \begin{pmatrix} \xi_r & 0 & \eta_r \\ 0 & 1 & 0 \\ \xi_z & 0 & \eta_z \end{pmatrix} \begin{pmatrix} p_\xi \\ 0 \\ p_\eta \end{pmatrix}$$
$$= \frac{g}{J}\begin{pmatrix} z_\eta & 0 & -z_\xi \\ 0 & \dfrac{J}{g} & 0 \\ -r_\eta & 0 & r_\xi \end{pmatrix}\begin{pmatrix} p_\xi \\ 0 \\ p_\eta \end{pmatrix}$$
$$= \frac{g}{J} T^T \nabla_\Xi p$$

$$\nabla \cdot \vec{u} = \frac{1}{J} \nabla_\Xi \cdot \vec{u} = 0 \tag{28}$$

$$\nabla_\Xi \cdot \vec{u} = \nabla_\Xi \cdot \left[ g \begin{pmatrix} z_\eta & 0 & -r_\eta \\ 0 & \dfrac{J}{g} & 0 \\ -z_\xi & 0 & r_\xi \end{pmatrix} \begin{pmatrix} u \\ v \\ w \end{pmatrix} \right] \tag{29}$$
$$= \nabla_\Xi \cdot [g(uz_\eta - wr_\eta) \; Jv \; g(wr_\xi - uz_\xi)]$$
$$= \nabla_\Xi \cdot [g(uz_\eta - wr_\eta)g(r_\xi z_\eta - r_\eta z_\xi)v \; g(wr_\xi - uz_\xi)]$$
$$= \begin{aligned} & g_{,\xi}(uz_\eta - wr_\eta) + g(uz_\eta - wr_\eta)_{,\xi} + g_{,\eta}(wr_\xi - uz_\xi) + \\ & g(wr_\xi - uz_\xi)_{,\eta} \end{aligned}$$
$$= 2\pi\{(r_\xi z_\eta - r_\eta z_\xi)u + r[z_\eta(u_r r_\xi + u_z z_\xi) - z_\xi(u_r r_\eta + u_z z_\eta) - r_\eta(w_r r_\xi + w_z z_\xi) + r_\xi(w_r r_\eta + w_z z_\eta)]\}$$
$$= 2\pi[(r_\xi z_\eta - r_\eta z_\xi)u + r(r_\xi z_\eta - r_\eta z_\xi)(u_r + w_z)]$$
$$= J\nabla \cdot \vec{u}$$

$$(\vec{u} \cdot \nabla)\vec{u} = \left(u\frac{\partial}{\partial r} + w\frac{\partial}{\partial z}\right)(u \; v \; w)^T + \frac{v}{r}(-v \; u \; 0)^T \tag{30}$$
$$= \frac{1}{J}[(gT\vec{u}) \cdot \nabla_\Xi]\vec{u} + \frac{v}{r}(-v \; u \; 0)^T$$
$$= \frac{1}{J}(\vec{\bar{u}} \cdot \nabla_\Xi)\vec{u} + \frac{v}{r}(-v \; u \; 0)^T$$
$$= \frac{1}{J}(\vec{\bar{u}} \cdot \nabla_\Xi)\vec{u} + \frac{v}{r}\vec{u}^\perp$$

$$(\vec{u} \cdot \nabla)\phi = \frac{1}{J}(\vec{\bar{u}} \cdot \nabla_\Xi)\phi \tag{31}$$

$$\frac{\nabla \cdot (2\mu(\phi)D)}{\rho(\phi)\mathrm{Re}} = \frac{(\nabla \mu(\phi)) \cdot \left(\nabla \vec{u} + (\nabla \vec{u})^T\right) + \mu(\phi) \nabla \cdot \left(\nabla \vec{u} + (\nabla \vec{u})^T\right)}{\rho(\phi)\mathrm{Re}} \tag{32}$$

$$\nabla \cdot \left[(\nabla \vec{u})^T\right] = 0 \tag{33}$$

$$\frac{1}{\rho(\phi)\mathrm{Re}} \nabla \cdot [2\mu(\phi)D] = \tag{34}$$
$$\frac{g}{J\rho(\phi)\mathrm{Re}}[T^T \nabla_\Xi \mu(\phi)] \cdot \left[\frac{g}{J}T^T \nabla_\Xi \vec{u} + \left(\frac{g}{J}T^T \nabla_\Xi \vec{u}\right)^T + r\frac{\partial(v/r)}{\partial r}I_0\right] +$$
$$\frac{\mu(\phi)}{\rho(\phi)\mathrm{Re}} \nabla^2 \vec{u}$$

$$I_0 = \begin{pmatrix} 0 & 1 & 0 \\ 1 & 0 & 0 \\ 0 & 0 & 0 \end{pmatrix} \tag{35}$$

$$\nabla \cdot \nabla \vec{u} = \frac{1}{r}\begin{pmatrix} \dfrac{\partial}{\partial r} \\ \dfrac{\partial}{r\partial \theta} \\ \dfrac{\partial}{\partial z} \end{pmatrix}^T \left( r\begin{pmatrix} u_r & v_r & w_r \\ 0 & 0 & 0 \\ u_z & v_z & w_z \end{pmatrix} \right) - \begin{pmatrix} \dfrac{u}{r^2} \\ \dfrac{v}{r^2} \\ 0 \end{pmatrix} \tag{36}$$

$$\begin{pmatrix} u_r & v_r & w_r \\ 0 & 0 & 0 \\ u_z & v_z & w_z \end{pmatrix} = \begin{pmatrix} \xi_r & 0 & \eta_r \\ 0 & 1 & 0 \\ \xi_z & 0 & \eta_z \end{pmatrix}\begin{pmatrix} u_\xi & v_\xi & w_\xi \\ 0 & 0 & 0 \\ u_\eta & v_\eta & w_\eta \end{pmatrix} \tag{37}$$
$$= \frac{g}{J}T^T \begin{pmatrix} u_\xi & v_\xi & w_\xi \\ 0 & 0 & 0 \\ u_\eta & v_\eta & w_\eta \end{pmatrix}$$

$$\begin{pmatrix} \frac{\partial}{\partial r} \\ \frac{\partial}{r\partial\theta} \\ \frac{\partial}{\partial z} \end{pmatrix}^T \begin{pmatrix} \alpha_{11} & \alpha_{12} & \alpha_{13} \\ 0 & 0 & 0 \\ \alpha_{31} & \alpha_{32} & \alpha_{33} \end{pmatrix} \quad (38)$$

$$= \frac{g}{J} \begin{pmatrix} \frac{\partial}{\partial\xi} \\ \frac{\partial}{r\partial\theta} \\ \frac{\partial}{\partial\eta} \end{pmatrix}^T \left\{ \begin{pmatrix} z_\eta & 0 & -r_\eta \\ 0 & 1 & 0 \\ -z_\xi & 0 & r_\xi \end{pmatrix} \begin{pmatrix} \alpha_{11} & \alpha_{12} & \alpha_{13} \\ 0 & 0 & 0 \\ \alpha_{31} & \alpha_{32} & \alpha_{33} \end{pmatrix} \right\}$$

$$= \frac{g}{J} \nabla_\Xi \cdot \left\{ T \begin{pmatrix} \alpha_{11} & \alpha_{12} & \alpha_{13} \\ 0 & 0 & 0 \\ \alpha_{31} & \alpha_{32} & \alpha_{33} \end{pmatrix} \right\}$$

$$\frac{\mu(\phi)}{\rho(\phi)\mathrm{Re}} \nabla \cdot \nabla \vec{u} = \frac{\mu(\phi)}{J\rho(\phi)\mathrm{Re}} \nabla_\Xi \cdot \left\{ \frac{g^2}{J} TT^T \nabla_\Xi \vec{u} \right\} - \frac{\mu(\phi)}{\rho(\phi)\mathrm{Re}} \begin{pmatrix} \frac{u}{r^2} \\ \frac{v}{r^2} \\ 0 \end{pmatrix} \quad (39)$$

$$\frac{1}{\rho(\phi)\mathrm{Re}} \nabla \cdot [2\mu(\phi)D] = \quad (40)$$

$$\frac{g}{J\rho(\phi)\mathrm{Re}} [T^T \nabla_\Xi \mu(\phi)] \cdot \left[ \frac{g}{J} T^T \nabla_\Xi \vec{u} + \left(\frac{g}{J} T^T \nabla_\Xi \vec{u}\right)^T + r\frac{\partial(v/r)}{\partial r} I_0 \right] +$$

$$\frac{\mu(\phi)}{J\rho(\phi)\mathrm{Re}} \nabla_\Xi \cdot \left\{ \frac{g^2}{J} TT^T \nabla_\Xi \vec{u} \right\} - \frac{\mu(\phi)}{\rho(\phi)\mathrm{Re}} \begin{pmatrix} \frac{u}{r^2} \\ \frac{v}{r^2} \\ 0 \end{pmatrix}$$

$$\kappa(\phi) = \nabla \cdot \left( \frac{\nabla\phi}{|\nabla\phi|} \right) \quad (41)$$

$$= \frac{1}{J} \nabla_\Xi \cdot \left( gT \frac{T^T \nabla_\Xi \phi}{|T^T \nabla_\Xi \phi|} \right)$$

$$-\frac{1}{\rho(\phi)We} \kappa(\phi)\delta(\phi)\nabla\phi = -\frac{g\delta(\phi)}{J^2\rho(\phi)We} \nabla_\Xi \cdot \quad (42)$$

$$\left( gT \frac{T^T \nabla_\Xi \phi}{|T^T \nabla_\Xi \phi|} \right)(T^T \nabla_\Xi \phi)$$

$$\nabla \cdot \tau = \frac{1}{r}\left( \frac{\partial}{\partial r} \frac{\partial}{r\partial\theta} \frac{\partial}{\partial z} \right) \cdot (r\tau) + \frac{1}{r}(-\tau_{\theta\theta}\ \tau_{r\theta}\ 0)^T \quad (43)$$

$$= \frac{1}{J} \nabla_\Xi \cdot (gT\tau) + \frac{1}{r}(-\tau_{\theta\theta}\ \tau_{r\theta}\ 0)^T$$

$$= \frac{1}{J} \nabla_\Xi \cdot \bar{\tau} + \frac{1}{r}(-\tau_{\theta\theta}\ \tau_{r\theta}\ 0)^T$$

$$(\vec{u} \cdot \nabla)\tau = \left[ (u\hat{e}_r + v\hat{e}_\theta + w\hat{e}_z) \cdot \left( \hat{e}_r \frac{\partial}{\partial r} + \hat{e}_\theta \frac{1}{r}\frac{\partial}{\partial\theta} + \hat{e}_z \frac{\partial}{\partial z} \right) \right] \tau \quad (44)$$

$$= \left( u\frac{\partial}{\partial r} + \frac{v}{r}\frac{\partial}{\partial\theta} + w\frac{\partial}{\partial z} \right)\tau = \left( u\frac{\partial}{\partial r} + w\frac{\partial}{\partial z} \right)\tau + \frac{v}{r}\frac{\partial}{\partial\theta}\tau$$

$$= \frac{1}{J}(\vec{u} \cdot \nabla_\Xi)\tau + \frac{v}{r}\frac{\partial}{\partial\theta}\tau$$

$$= \frac{1}{J}(\vec{u} \cdot \nabla_\Xi)\tau + \frac{v}{r}\tau_v$$

$$\tau_v = \frac{\partial}{\partial\theta}\tau \quad (45)$$

$$= \frac{\partial}{\partial\theta}\begin{pmatrix} \tau_{rr}\hat{e}_r\hat{e}_r + \tau_{r\theta}\hat{e}_r\hat{e}_\theta + \tau_{rz}\hat{e}_r\hat{e}_z \\ +\tau_{\theta r}\hat{e}_\theta\hat{e}_r + \tau_{\theta\theta}\hat{e}_\theta\hat{e}_\theta + \tau_{\theta z}\hat{e}_\theta\hat{e}_z \\ +\tau_{zr}\hat{e}_z\hat{e}_r + \tau_{z\theta}\hat{e}_z\hat{e}_\theta + \tau_{zz}\hat{e}_z\hat{e}_z \end{pmatrix}$$

$$= \begin{pmatrix} \tau_{rr}(\hat{e}_\theta\hat{e}_r + \hat{e}_r\hat{e}_\theta) + \tau_{r\theta}(\hat{e}_\theta\hat{e}_\theta - \hat{e}_r\hat{e}_r) + \tau_{rz}\hat{e}_\theta\hat{e}_z \\ +\tau_{r\theta}(\hat{e}_\theta\hat{e}_\theta - \hat{e}_r\hat{e}_r) + \tau_{\theta\theta}(-\hat{e}_\theta\hat{e}_r - \hat{e}_r\hat{e}_\theta) - \tau_{\theta z}\hat{e}_r\hat{e}_z \\ +\tau_{rz}\hat{e}_z\hat{e}_\theta + \tau_{\theta z}\hat{e}_z\hat{e}_r + 0 \end{pmatrix}$$

$$\tau_v = \begin{pmatrix} -2\tau_{r\theta} & \tau_{rr} - \tau_{\theta\theta} & -\tau_{\theta z} \\ \tau_{rr} - \tau_{\theta\theta} & 2\tau_{r\theta} & \tau_{rz} \\ -\tau_{\theta z} & \tau_{rz} & 0 \end{pmatrix}$$

$$\tau \cdot \nabla\vec{u} = \tau \cdot \left[ \frac{g}{J} T^T \nabla_\Xi \vec{u} + \frac{u}{r} I_{22} - \frac{v}{r} I_{21} \right] \quad (46)$$

$$I_{21} = \begin{pmatrix} 0 & 0 & 0 \\ 1 & 0 & 0 \\ 0 & 0 & 0 \end{pmatrix} \quad I_{22} = \begin{pmatrix} 0 & 0 & 0 \\ 0 & 1 & 0 \\ 0 & 0 & 0 \end{pmatrix} \quad (47)$$

$$\frac{\partial\vec{u}}{\partial t} + \frac{1}{J}(\vec{u} \cdot \nabla_\Xi)\vec{u} + \frac{v}{r}\vec{u}_\perp = \quad (48)$$

$$-\frac{1}{\rho(\phi)J}gT^T\nabla_\Xi p - \frac{g\delta(\phi)}{J^2\rho(\phi)We}\nabla_\Xi \cdot$$

$$\left( gT\frac{T^T\nabla_\Xi\phi}{|T^T\nabla_\Xi\phi|} \right)(T^T\nabla_\Xi\phi) +$$

$$(\text{Viscosity term}) + \frac{1}{J}\nabla_\Xi \cdot \bar{\tau} + \frac{1}{r}(-\tau_{\theta\theta}\ \tau_{r\theta}\ 0)^T$$

$$\frac{\partial\tau}{\partial t} + \frac{1}{J}(\vec{u} \cdot \nabla_\Xi)\tau + \frac{v}{r}\tau_v = \tau \cdot \quad (49)$$

$$\left[ \frac{g}{J}T^T\nabla_\Xi \vec{u} + \frac{u}{r}I_{22} - \frac{v}{r}I_{21} \right] +$$

$$\left[ \frac{g}{J}T^T\nabla_\Xi \vec{u} + \frac{u}{r}I_{22} - \frac{v}{r}I_{21} \right]^T \cdot \tau^T -$$

$$\frac{1}{\lambda(\phi)}\left\{ \tau - \frac{\mu_p(\phi)}{\mathrm{Re}_p}\left[ \frac{g}{J}T^T\nabla_\Xi \vec{u} + \left(\frac{g}{J}T^T\nabla_\Xi \vec{u}\right)^T + r\frac{\partial(v/r)}{\partial r}I_0 \right] \right\}$$

$$\nabla_\Xi \cdot \vec{u} = 0 \quad (50)$$

$$\frac{\partial\phi}{\partial t} + \frac{1}{J}\vec{u} \cdot \nabla_\Xi \phi = 0 \quad (51)$$

$$\vec{u}^n = \vec{u}(t^n) \quad (52)$$

$$\phi^{n+1} = \phi^n - \Delta t[\vec{u} \cdot \nabla\phi]^{n+1/2} \quad (53)$$

$$\phi^{n+1/2} = \frac{1}{2}(\phi^n + \phi^{n+1}) \quad (54)$$

$$\vec{u}^{**} = \vec{u}^n + \Delta t\left\{ -[(\vec{u} \cdot \nabla)\vec{u}]^{n+1/2} - \frac{1}{\rho(\phi^{n+1/2})}\nabla p^{n-1/2} + \quad (55)\right.$$

$$\frac{1}{\rho(\phi^{n+1/2})\mathrm{Re}}\nabla \cdot [\mu(\phi^{n+1/2})D^n] + \nabla \cdot \tau^{n+1/2} -$$

$$\left. \frac{1}{\rho(\phi^{n+1/2})We}[\kappa(\phi)\delta(\phi)\nabla\phi]^{n+1/2} \right\}$$

$$\vec{u}^{**} = \vec{u}^* - \frac{\Delta t}{\rho(\phi^{n+1/2})\mathrm{Re}}\nabla \cdot [\mu(\phi^{n+1/2})D^*] \quad (56)$$

$$D^* = \frac{1}{2}\left[ \nabla\vec{u}^* + (\nabla\vec{u}^*)^T \right] \quad (57)$$

$$\vec{u}^* \leftarrow \vec{u}^* + \frac{\Delta t}{\rho(\phi^{n+1/2})}\nabla p^{n-1/2} \quad (58)$$

$$\vec{u}^{n+1} = \vec{u}^* - \frac{\Delta t}{\rho(\phi^{n+1/2})} \nabla p^{n+1/2} \tag{59}$$

$$\nabla \cdot \vec{u}^* = \nabla \cdot \left( \frac{\Delta t}{\rho(\phi^{n+1/2})} \nabla p^{n+1/2} \right) \tag{60}$$

$$\int_\Omega \vec{u}^* \cdot \nabla \psi dV = \int_\Omega \frac{\Delta t}{\rho(\phi^{n+1/2})} \nabla p^{n+1/2} \cdot \nabla \psi dV + \int_{\Gamma_1} \psi \vec{u}^{BC} \cdot \hat{n} dS \tag{61}$$

$$\frac{\Delta t}{\rho(\phi^{n+1/2})} \frac{\partial p^{n+1/2}}{\partial \hat{n}} = (\vec{u}^* - \vec{u}^{BC}) \cdot \hat{n} \tag{62}$$

$$\frac{\tau^{n+1} - \tau^n}{\Delta t} = \left[ -(\vec{u} \cdot \nabla)\tau + \tau \cdot (\nabla \vec{u}) + (\nabla \vec{u})^T \cdot \tau \right]^{n+1/2} - \frac{1}{\lambda(\phi^{n+1/2})}\left( \tau^{n+1} - 2\frac{\mu_p(\phi^{n+1/2})}{\mathrm{Re}_p} D^{n+1/2} \right) \tag{63}$$

$$\left(1 + \frac{\Delta t}{\lambda_p(\phi^{n+1/2})}\right)\tau^{n+1} = \tag{64}$$
$$\tau^n + \Delta t \left[ -(\vec{u} \cdot \nabla)\tau + \tau \cdot (\nabla \vec{u}) + (\nabla \vec{u})^T \cdot \tau \right]^{n+1/2} + \frac{2\Delta t \mu_p(\phi^{n+1/2})}{\lambda(\phi^{n+1/2})\mathrm{Re}_p} D^{n+1/2}$$

$$\vec{u} \equiv u(r,z)\hat{e}_r + v(r,z)\hat{e}_\theta + w(r,z)\hat{e}_z \tag{65}$$
$$p \equiv p(r,z) \quad \phi \equiv \phi(r,z)$$
$$\tau \equiv \begin{pmatrix} \tau_{rr} & \tau_{r\theta} & \tau_{rz} \\ \tau_{r\theta} & \tau_{\theta\theta} & \tau_{\theta z} \\ \tau_{rz} & \tau_{\theta z} & \tau_{zz} \end{pmatrix}$$

$$X_{i,j} \equiv \frac{1}{4}\left( X_{i-\frac{1}{2},j-\frac{1}{2}} + X_{i-\frac{1}{2},j+\frac{1}{2}} + X_{i+\frac{1}{2},j-\frac{1}{2}} + X_{i+\frac{1}{2},j+\frac{1}{2}} \right) \tag{66}$$

$$(X_\xi)_{i,j} \equiv \frac{1}{2}\left( X_{i+\frac{1}{2},j+\frac{1}{2}} - X_{i-\frac{1}{2},j+\frac{1}{2}} + X_{i+\frac{1}{2},j-\frac{1}{2}} - X_{i-\frac{1}{2},j-\frac{1}{2}} \right) \tag{67}$$

$$[(\vec{u} \cdot \nabla)\vec{u}]_{i,j}^{n+1/2} = \left[\frac{1}{J}(\vec{u} \cdot \nabla_\Xi)\vec{u} + \frac{v}{r}\vec{u}_\perp\right]_{i,j}^{n+1/2} \tag{68}$$
$$= \frac{1}{J_{i,j}}\left[ \frac{\bar{u}_{i+1/2,j}^{n+1/2} + \bar{u}_{i-1/2,j}^{n+1/2}}{2}\left(\vec{u}_{i+1/2,j}^{n+1/2} - \vec{u}_{i-1/2,j}^{n+1/2}\right) + \frac{\bar{w}_{i,j+1/2}^{n+1/2} + \bar{w}_{i,j-1/2}^{n+1/2}}{2}\left(\vec{u}_{i,j+1/2}^{n+1/2} - \vec{u}_{i,j-1/2}^{n+1/2}\right) \right] + \frac{v_{i,j}^{n+1/2}}{r_{i,j}}\vec{u}_{\perp,i,j}^{n+1/2}$$

$$[(\vec{u} \cdot \nabla)\phi]_{i,j}^{n+1/2} = \left[\frac{1}{J}(\vec{u} \cdot \nabla_\Xi)\phi\right]_{i,j}^{n+1/2} = \tag{69}$$
$$\frac{1}{J_{i,j}}\left[ \frac{\bar{u}_{i+1/2,j}^{n+1/2} + \bar{u}_{i-1/2,j}^{n+1/2}}{2}(\phi_{i+1/2,j}^{n+1/2} - \phi_{i-1/2,j}^{n+1/2}) + \frac{\bar{w}_{i,j+1/2}^{n+1/2} + \bar{w}_{i,j-1/2}^{n+1/2}}{2}(\phi_{i,j+1/2}^{n+1/2} - \phi_{i,j-1/2}^{n+1/2}) \right]$$

$$\vec{u}_{i+1/2,j}^{n+1/2,L} = \vec{u}_{i,j}^n + \frac{1}{2}\vec{u}_{\xi,i,j}^n + \frac{\Delta t}{2}\vec{u}_{t,i,j}^n \tag{70}$$
$$= \vec{u}_{i,j}^n + \left(\frac{1}{2} - \frac{\Delta t}{2J_{i,j}}\bar{u}_{i,j}^n\right)\vec{u}_{\xi,i,j}^n - \frac{\Delta t}{2J_{i,j}}(\bar{w}\vec{u}_\eta)_{i,j}^n - \frac{\Delta t}{2}\left(\frac{v}{r}\vec{u}_\perp\right)_{i,j}^n + \frac{\Delta t}{2}\vec{F}_{i,j}^n$$

$$\vec{F}_{i,j}^n = \begin{Bmatrix} -\frac{g}{\rho(\phi)J}T^T\nabla_\Xi p + \text{(Viscosity term)} + \\ \text{(Surface tension)} + \frac{1}{J}\nabla_\Xi \cdot \vec{\tau} + \frac{1}{r}(-\tau_{\theta\theta}\ \tau_{r\theta}\ 0)^T \end{Bmatrix}_{i,j}^n \tag{71}$$

$$\vec{u}_{i+1/2,j}^{n+1/2,R} = \vec{u}_{i+1,j}^n - \frac{1}{2}\vec{u}_{\xi,i+1,j}^n + \frac{\Delta t}{2}\vec{u}_{t,i+1,j}^n \tag{72}$$
$$= \vec{u}_{i+1,j}^n - \left(\frac{1}{2} + \frac{\Delta t}{2J_{i+1,j}}\bar{u}_{i+1,j}^n\right)\vec{u}_{\xi,i+1,j}^n - \frac{\Delta t}{2J_{i+1,j}}(\bar{w}\vec{u}_\eta)_{i+1,j}^n - \frac{\Delta t}{2}\left(\frac{v}{r}\vec{u}_\perp\right)_{i+1,j}^n + \frac{\Delta t}{2}\vec{F}_{i+1,j}^n$$

$$\vec{u}_{i+1/2,j}^{n+1/2} = \begin{cases} \vec{u}_{i+1/2,j}^{n+1/2,L} & \text{if } \bar{u}_{i+1/2,j}^{n+1/2,L} > 0\ \&\ \bar{u}_{i+1/2,j}^{n+1/2,L} + \bar{u}_{i+1/2,j}^{n+1/2,R} > 0 \\ \vec{u}_{i+1/2,j}^{n+1/2,R} & \text{if } \bar{u}_{i+1/2,j}^{n+1/2,R} < 0\ \&\ \bar{u}_{i+1/2,j}^{n+1/2,L} + \bar{u}_{i+1/2,j}^{n+1/2,R} < 0 \\ 0 & \text{otherwise} \end{cases} \tag{73}$$

$$\psi_{i+1/2,j}^{n+1/2} = \begin{cases} \psi_{i+1/2,j}^{n+1/2,L} & \text{if } \bar{u}_{i+1/2,j}^{n+1/2} > 0 \\ \psi_{i+1/2,j}^{n+1/2,R} & \text{if } \bar{u}_{i+1/2,j}^{n+1/2} < 0 \quad \psi \equiv \{\vec{u}, \phi\} \\ \frac{\psi_{i+1/2,j}^{n+1/2,L} + \psi_{i+1/2,j}^{n+1/2,R}}{2} & \text{if } \bar{u}_{i+1/2,j}^{n+1/2} = 0 \end{cases} \tag{74}$$

$$\vec{u}^e - \frac{1}{\rho(\phi^n)}\nabla q \tag{75}$$

$$\nabla \cdot \left(\frac{1}{\rho(\phi^n)}\nabla q\right) = \nabla \cdot \vec{u}^e \tag{76}$$

$$\nabla_\Xi \cdot \vec{u}^e = \nabla_\Xi \cdot \left( \frac{g^2}{\rho(\phi^n)J} TT^T \nabla_\Xi q \right) \tag{77}$$

$$q = \Delta t(p^{BC}(t^{n+1/2}) - p^{BC}(t^{n-1/2})) \tag{78}$$

$$\vec{u}^e \leftarrow \vec{u}^e - \frac{g^2}{\rho(\phi^n)J}TT^T \nabla_\Xi q. \tag{79}$$

$$D_\xi^c(u)_{i,j} = (u_{i+1,j} - u_{i-1,j})/2 \tag{80}$$
$$D_\xi^+(u)_{i,j} = (u_{i+1,j} - u_{i,j})$$
$$D_\xi^-(u)_{i,j} = (u_{i,j} - u_{i-1,j})$$

$$\delta_{\lim}(u)_{i,j} = \begin{cases} \min(2|D_\xi^-(u)_{i,j}|, 2|D_\xi^+(u)_{i,j}|) & \text{if } (D_\xi^-(u)_{i,j})(D_\xi^+(u)_{i,j}) > 0 \\ 0 & \text{otherwise} \end{cases} \tag{81}$$

$$(u_\xi)_{i,j} = \min(|D_\xi^c(u)_{i,j}|, \delta_{\lim}(u)_{i,j}) \times \mathrm{sign}(D_\xi^c(u)_{i,j}) \tag{82}$$

$$(\bar{w}\vec{u}_\eta)_{i,j}^n = \max(\bar{w}_{i,j}^n, 0)(\vec{u}_{i,j}^n - \vec{u}_{i,j-1}^n) + \min(\bar{w}_{i,j}^n, 0)(\vec{u}_{i,j+1}^n - \vec{u}_{i,j}^n) \tag{83}$$

$$\frac{v_{i,j}^{n+1/2}}{r_{i,j}}\vec{u}_{\perp,i,j}^{n+1/2} = \frac{1}{16r_{i,j}}\begin{pmatrix} v_{i+1/2,j}^{n+1/2} + v_{i-1/2,j}^{n+1/2} + \\ v_{i,j+1/2}^{n+1/2} + v_{i,j-1/2}^{n+1/2} \end{pmatrix} \tag{84}$$
$$(\vec{u}_{\perp,i+1/2,j}^{n+1/2} + \vec{u}_{\perp,i-1/2,j}^{n+1/2} + \vec{u}_{\perp,i,j+1/2}^{n+1/2} + \vec{u}_{\perp,i,j-1/2}^{n+1/2})$$

$$\nabla_\Xi \cdot \left( \frac{g^2}{J}TT^T \nabla_\Xi \vec{u} \right) = (\alpha \vec{u}_\xi)_\xi + (\beta \vec{u}_\eta)_\xi + (\beta \vec{u}_\xi)_\eta + (\gamma \vec{u}_\eta)_\eta \tag{85}$$

$$\alpha = \frac{g^2}{J}(x_\eta^2 + y_\eta^2) \tag{86}$$
$$\beta = -\frac{g^2}{J}(x_\xi x_\eta + y_\xi y_\eta)$$
$$\gamma = \frac{g^2}{J}(x_\xi^2 + y_\xi^2)$$

$$[(\alpha \vec{u}_\xi)_\xi]_{i,j} = (\alpha \vec{u}_\xi)_{i+1/2,j} - (\alpha \vec{u}_\xi)_{i-1/2,j} \tag{87}$$
$$= \frac{\alpha_{i+1,j} + \alpha_{i,j}}{2}(\vec{u}_{i+1,j} - \vec{u}_{i,j}) - \frac{\alpha_{i,j} + \alpha_{i-1,j}}{2}(\vec{u}_{i,j} - \vec{u}_{i-1,j})$$

-continued $$\left[(\vec{u}\cdot\nabla)\tau\right]_{i,j}^{n+1/2} = \left[\frac{1}{J}(\vec{u}\cdot\nabla_\Xi)\tau + \frac{v}{r}\tau_v\right]_{i,j}^{n+1/2} \quad (88)$$

$$= \frac{1}{J_{i,j}}\left[\begin{array}{c}\frac{\bar{u}_{i+1/2,j}^{n+1/2} + \bar{u}_{i-1/2,j}^{n+1/2}}{2}(\tau_{i+1/2,j}^{n+1/2} - \tau_{i-1/2,j}^{n+1/2}) + \\ \frac{\bar{w}_{i,j+1/2}^{n+1/2} + \bar{w}_{i,j-1/2}^{n+1/2}}{2}(\tau_{i,j+1/2}^{n+1/2} - \tau_{i,j-1/2}^{n+1/2})\end{array}\right] +$$

$$\frac{v_{i,j}^{n+1/2}}{r_{i,j}}\tau_{v,i,j}^{n+1/2}$$

$$\tau_{i+1/2,j}^{n+1/2,L} = \tau_{i,j}^n + \frac{1}{2}\tau_{\xi,i,j}^n + \frac{\Delta t}{2}\tau_{t,i,j}^n \quad (89)$$

$$= \tau_{i,j}^n + \left(\frac{1}{2} - \frac{\Delta t}{2J_{i,j}}\bar{u}_{i,j}^n\right)\tau_{\xi,i,j}^n - \frac{\Delta t}{2J_{i,j}}(\bar{w}\tau_\eta)_{i,j}^n -$$

$$\frac{\Delta t}{2}\left(\frac{v}{r}\tau_v\right)_{i,j}^n + \frac{\Delta t}{2}G_{i,j}^n$$

$$G_{i,j}^n = \left\{\tau\cdot(\nabla\vec{u}) + (\nabla\vec{u})^T\cdot\tau - \frac{1}{\lambda(\phi)}\left(\tau - 2\frac{\mu_p(\phi)}{Re_p}D\right)\right\}_{i,j}^n \quad (90)$$

$$\tau_{i+1/2,j}^{n+1/2,R} = \tau_{i+1,j}^n - \frac{1}{2}\tau_{\xi,i+1,j}^n + \frac{\Delta t}{2}\tau_{t,i+1,j}^n \quad (91)$$

$$= \tau_{i+1,j}^n - \left(\frac{1}{2} + \frac{\Delta t}{2J_{i+1,j}}\bar{u}_{i+1,j}^n\right)\tau_{\xi,i+1,j}^n - \frac{\Delta t}{2J_{i+1,j}}(\bar{w}\tau_\eta)_{i+1,j}^n -$$

$$\frac{\Delta t}{2}\left(\frac{v}{r}\tau_v\right)_{i+1,j}^n + \frac{\Delta t}{2}G_{i+1,j}^n$$

$$\tau_{i+1/2,j}^{n+1/2} = \begin{cases}\tau_{i+1/2,j}^{n+1/2,L} & \text{if } \bar{u}_{i+1/2,j}^{n+1/2} > 0 \\ \tau_{i+1/2,j}^{n+1/2,R} & \text{if } \bar{u}_{i+1/2,j}^{n+1/2} < 0 \\ \frac{\tau_{i+1/2,j}^{n+1/2,L} + \tau_{i+1/2,j}^{n+1/2,R}}{2} & \text{if } \bar{u}_{i+1/2,j}^{n+1/2} = 0\end{cases} \quad (92)$$

$$\frac{v_{i,j}^{n+1/2}}{r_{i,j}}\tau_{v,i,j}^{n+1/2} = \frac{1}{16r_{i,j}}(v_{i+1/2,j}^{n+1/2} + v_{i-1/2,j}^{n+1/2} + v_{i,j+1/2}^{n+1/2} + v_{i,j-1/2}^{n+1/2}) \quad (93)$$

$$(\tau_{v,i+1/2,j}^{n+1/2} + \tau_{v,i-1/2,j}^{n+1/2} + \tau_{v,i,j+1/2}^{n+1/2} + \tau_{v,i,j-1/2}^{n+1/2})$$

$$\left[\tau\cdot(\nabla\vec{u})\right]_{i,j}^{n+1/2} = \left[\tau\cdot\left(\frac{g}{J}T^T\nabla_\Xi\vec{u} + \frac{u}{r}I_{22} - \frac{v}{r}I_{21}\right)\right]_{i,j}^{i+1/2} \quad (94)$$

$$\tau_{i,j}^{n+1/2} = \frac{\tau_{i+1/2,j}^{n+1/2} + \tau_{i-1/2,j}^{n+1/2} + \tau_{i,j+1/2}^{n+1/2} + \tau_{i,j-1/2}^{n+1/2}}{4} \quad (95)$$

$$\left(\frac{g}{J}T^T\nabla_\Xi\vec{u}\right)_{i,j}^{n+1/2} = \left(\frac{g}{J}T^T\right)_{i,j}\begin{pmatrix}u_\xi & v_\xi & w_\xi \\ 0 & 0 & 0 \\ u_\eta & v_\eta & w_\eta\end{pmatrix}_{i,j}^{n+1/2} \quad (96)$$

$$u_{\xi,i,j}^{n+1/2} = u_{i+1/2,j}^{n+1/2} - u_{i-1/2,j}^{n+1/2}, u_{\eta,i,j}^{n+1/2} = u_{i,j+1/2}^{n+1/2} - u_{i,j-1/2}^{n+1/2} \quad (97)$$

$$\frac{u_{i,j}^{n+1/2}}{r_{i,j}} = \frac{u_{i+1/2,j}^{n+1/2} + u_{i-1/2,j}^{n+1/2} + u_{i,j+1/2}^{n+1/2} + u_{i,j-1/2}^{n+1/2}}{4r_{i,j}} \quad (98)$$

$$(\nabla\cdot\tau)_{i,j}^{n+1/2} = \left[\frac{1}{J}\nabla_\Xi\cdot\bar{\tau} + \frac{1}{r}(-\tau_{\theta\theta}\ \tau_{r\theta}\ 0)^T\right]_{i,j}^{n+1/2} \quad (99)$$

$$= \frac{1}{J_{i,j}}\left[\begin{array}{c}(gT\tau)_{i+1/2,j}^{n+1/2} - (gT\tau)_{i-1/2,j}^{n+1/2} + \\ (gT\tau)_{i,j+1/2}^{n+1/2} - (gT\tau)_{i,j-1/2}^{n+1/2}\end{array}\right] +$$

$$\frac{1}{r_{i,j}}(-\tau_{\theta\theta,i,j}^{n+1/2}\ \tau_{r\theta,i,j}^{n+1/2}\ 0)^T$$

$$(gT)_{i+1/2,j}^{n+1/2} = \pi r_{i+1/2,j}(T_{i+1,j} + T_{i,j}) \quad (100)$$

$$H(\phi) = \begin{cases}0 & \text{if } \phi < -\varepsilon \\ \frac{1}{2}\left[1 + \frac{\phi}{\varepsilon} + \frac{1}{\pi}\sin\left(\frac{\pi\phi}{\varepsilon}\right)\right] & \text{if } |\phi| \leq \varepsilon \\ 1 & \text{if } \phi > \varepsilon\end{cases} \quad (101)$$

$$\delta(\phi) = \frac{dH(\phi)}{d\phi} \quad (102)$$

$$\varepsilon = \frac{\alpha}{2}(\Delta r + \Delta z) \quad (103)$$

$$\Delta t < \min_{i,j}\left[\frac{\Delta r}{|u| + \sqrt{2\tau_{rr} + \frac{2}{\lambda Re}}}, \frac{\Delta z}{|w| + \sqrt{2\tau_{zz} + \frac{2}{\lambda Re}}}, \sqrt{h^3 We\frac{\rho_1 + \rho_2}{8\pi}}, \frac{Re}{3}\frac{\rho}{\mu}\left(\frac{1}{\Delta r^2} + \frac{1}{\Delta z^2}\right)^{-1}, \sqrt{\frac{2h}{|\vec{F}|}}\right] \quad (104)$$

What is claimed is:

1. A method for simulating and analyzing viscoelastic fluid flow through, and ejection from, a channel, there being an interface between a first fluid and a second fluid, the method comprising:
   (i) performing finite difference analysis to solve, with reference to a quadrilateral grid, equations governing the viscoelastic flow of the first fluid and the second fluid through the channel; wherein
      (a) the equations governing the viscoelastic flow of the first fluid includes an azimuthal velocity term that describes an approximate description of the azimuthal flow of the first fluid;
      (b) the equations governing the viscoelastic flow include an approximation of the stress experienced by the first fluid being simulated;
      (c) the equations governing the viscoelastic flow include an advection term that includes the azimuthal velocity term; and
      (d) the finite difference analysis includes a second-order Godunov type upwind scheme that is used to update the advection terms over time; and
   (ii) updating, periodically during the simulation, a level set for the first and second fluids.

2. The method of claim 1, wherein the equations governing viscoelastic flow include a first velocity vector that is orthogonal to a horizontal component of a fluid velocity vector that describes the velocity of the first fluid and a vertical component of the first velocity vector is substantially zero.

3. The method of claim 2, wherein the fluid velocity vector and the first velocity vector are described with reference to an axially symmetric coordinate system, a radial component of the first velocity vector is equal to the negative of an azimuthal component of the fluid velocity vector, and an azimuthal component of the first velocity vector is equal to a radial component of the fluid velocity vector.

4. The method of claim 1, wherein the fluid flow of the second fluid is viscoelastic.

5. A non-transitory computer readable medium encoded with instructions for execution by a computer to perform the method recited in claim 1.

6. A system, comprising:
   at least one processor configured to perform finite difference analysis to solve, with reference to a quadrilateral grid, equations governing a viscoelastic flow of a first fluid and a second fluid through a channel; wherein
      (a) the equations governing the viscoelastic flow of the first fluid includes an azimuthal velocity term that describes an approximate description of the azimuthal flow of the first fluid,
      (b) the equations governing the viscoelastic flow include an approximation of the stress experienced by the first fluid being simulated, (c) the equations governing the viscoelastic flow include an advection term that includes the azimuthal velocity term, and (d) the finite difference analysis includes a second-order Godunov type upwind scheme that is used to update the advection term over time;

the at least one processor being further configured to update, periodically during the simulation, a level set for the first and second fluids.

7. The method of claim 1, wherein the equations governing the viscoelastic flow include a partial differential of a stress tensor along an azimuthal axis, which is defined as $$\frac{\partial \tau}{\partial \theta} = \begin{pmatrix} -2\tau_{r\theta} & \tau_{rr} - \tau_{\theta\theta} & -\tau_{\theta z} \\ \tau_{rr} - \tau_{\theta\theta} & 2\tau_{r\theta} & \tau_{rz} \\ -\tau_{\theta z} & \tau_{rz} & 0 \end{pmatrix}.$$

* * * * *